United States Patent [19]
Choi

[11] Patent Number: 5,796,466
[45] Date of Patent: Aug. 18, 1998

[54] PHOTOGRAPHIC PRINTER

[75] Inventor: Yong-hag Choi, Masan, Rep. of Korea

[73] Assignee: Samsung Aerospace Industries, LTD., Kyongsangnam-do, Rep. of Korea

[21] Appl. No.: 736,750

[22] Filed: Oct. 25, 1996

[30] Foreign Application Priority Data

Oct. 27, 1995 [KR] Rep. of Korea ............... 1995-37622

[51] Int. Cl.$^6$ .................. G03B 27/72; G03B 27/80
[52] U.S. Cl. .................. 355/35; 355/38; 355/68
[58] Field of Search .................. 355/32, 35, 38, 355/40, 67, 68, 69, 77, 37; 358/506, 474, 302

[56] References Cited

U.S. PATENT DOCUMENTS

| | | | |
|---|---|---|---|
| 4,933,754 | 6/1990 | Reed et al. | 355/40 |
| 5,122,831 | 6/1992 | Suzuki | 355/37 |
| 5,627,662 | 5/1997 | Holmes et al. | 358/474 |

*Primary Examiner*—D. Rutledge
*Attorney, Agent, or Firm*—Finnegan, Henderson, Farabow, Garrett & Dunner, L.L.P.

[57] ABSTRACT

A photographic printer includes a light source for radiating light rays for photographic printing to a film; a unit for fixing the film; a unit for providing a film information signal by detecting the light filtered through the film; an image processing unit for processing the film information signal and generating a corresponding control signal; an image display unit located between the light source and the film for displaying an image corresponding to the control signal; and a focusing unit for forming an image on a printing paper according to the light filtered through the image display means and the film.

34 Claims, 22 Drawing Sheets

FIG. 10

```
ADDRESS  00  01  · · ·  FF
    00 |  5 | 10 |
    01 | 20 |  5 |
     .
     .
     .
```
30

FIG. 11

```
ADDRESS  00  01  · · ·  FF
    00 | 10 |
    01
     .
     .
     .
```
38

LIGHT

PHOTOGRAPHIC PRINTER

BACKGROUND OF THE INVENTION

The present invention relates to a photographic printer, and more particularly, to a photographic printer by which partial exposure compensation, double exposure printing, and index photograph processing can be performed automatically.

In printing a film, visual effects vary according to exposure time, even though the same film negative is used. That is, by shortening or prolonging exposure time, a photograph can become fuzzy or dark. Also, in a partial exposure compensation, there are such well-known techniques as a burning with cover method performed by exposing a partially covered film negative, and a burning and inserting method performed by increasing the exposure of a particular portion. However, since the partial exposure compensation is performed manually, the compensation is difficult and requires a large amount of time. Also, a double exposure printing technique of duplicating two films to print is performed manually. Further, additional high-priced equipment is necessary to perform index photograph processing, a technique of compressing and arraying a plurality of photographs.

FIG. 1 shows a schematic configuration of a conventional photographic printer. The photographic printer includes a reflecting mirror 1, a lamp 2, a color compensating filter 3, a light diffusing portion 4, a film fixing stand 6, an image forming lens portion 7, a focusing optical path 8, an exposure shutter portion 9, a print paper fixing stand 11 and a printing controller 12. Reference numerals 5 and 10 denote a film and a print paper, respectively.

The process of printing a film will now be described referring to FIG. 1. The light emitted from the lamp 2 is reflected and focused by the reflecting mirror 1 and passed through the color compensating filter 3. While passing through the color compensating filter 3, the light changes to a diffused light at the light diffusing portion 4 and then is incident on the film 5 fixed on the film fixing stand 6. Accordingly, the image of the film 5 is formed by the image forming lens portion 7 on the print paper 10 fixed on the print paper fixing stand 11. The exposure shutter portion 9 not only blocks light during transfer of the print paper 10 and the film 5, but also controls the exposure amount by controlling the exposure time. An additional printing controller 12 controls the transferal of the film 5 and the print paper 10 and operations of the exposure shutter portion 9, the image forming lens portion 7 and the color compensating filter 3.

In the conventional photographic printer as shown in FIG. 1, since the exposure amount is controlled only by the luminosity of the lamp 2 and the length of time the exposure shutter portion 9 is open, only the total exposure amount can be controlled. Accordingly, manual compensation must be performed to control a partial exposure amount in the conventional photographic printer.

In FIG. 2, the burning with cover technique through the conventional manual operation is illustrated. As shown in the drawing, the technique exposes a partially covered film negative by manually holding an image marker 13 having a predetermined shape between the light diffusing portion 4 and the film negative 5.

In FIG. 3, the burning and inserting technique by the conventional manual operation is illustrated. As shown in the drawing, the technique is an exposure method in which the exposure amount at a particular portion is increased by manually holding an image marker 14 having a predetermined shape between the light diffusing portion 4 and the film negative 5.

Thus, in the conventional photographic printer, since the partial exposure compensation is performed manually, the process becomes difficult and requires a lot of time. Also, in the conventional photographic printer, double exposure printing and index photographs processing can not be performed automatically.

In the conventional index photograph processing method, an object is photographed by a scanner or a video camera to generate an image signal. Then, the image signal is converted to digital data and stored in a memory. A microcomputer performs digital image processing, e.g., compression, enlargement, copying, transformation and deletion, and outputs the result to a color laser printer. However, the conventional index photograph processing cannot be processed automatically and an additional equipment such as a color laser printer must be used.

SUMMARY OF THE INVENTION

To solve the above problems, it is an object of the present invention to provide a photographic printer by which partial exposure compensation, double exposure printing, and index photograph processing can be automatically performed.

Accordingly, to achieve the above object, there is provided a photographic printer comprising: a light source for radiating light rays for photographic printing to a film; means for fixing said film; means for providing a film information signal by detecting the light filtered through said film; image processing means for processing said film information signal based on a built-in algorithm and generating a corresponding control signal; image display means located between said light source and said film for displaying an image corresponding to said control signal; and means for forming an image on a printing paper according to the light filtered through said image display means and said film.

There is also provided a method for processing images in a photographic printer having a light source for radiating light rays for photographic printing to a film, means for fixing said film, means for providing a film information signal by detecting the light filtered through said film, image processing means for processing said film information signal and generating a corresponding control signal, image display means located between said light source and said film for displaying an image corresponding to said control signal, means for forming an image on a printing paper according to the light filtered through said image display means and said film, means for fixing said printing paper, exposure shutter means for controlling the exposure of said printing paper, and printing control means for controlling said film fixing means, said printing paper fixing means, said exposure shutter means, said forming means and said light source; wherein said image processing means has means for storing film information data by processing a film information signal input, a microcomputer for performing control of the entire system according to a built-in program and commands from a user, user input means for inputting data to said microcomputer by the user, means for displaying the output data of the microcomputer, a user interface for interfacing data transmitted and received between said microcomputer, said user input means and said display means, and image display driving means for generating an image display driving signal according to the control of said microcomputer; the method comprising the steps of: selecting a photographic printing mode by a user; loading a film cassette and a printing paper roll; determining the printing mode based on the input data and performing printing in accordance with the printing mode; confirming whether the printing operation will be continued after transferring the printing paper by one cut when the printing is completed according to the printing mode; and repeating the above steps or stopping the program according to a command input.

BRIEF DESCRIPTION OF THE DRAWINGS

The above object and advantages of the present invention will become more apparent by describing in detail a preferred embodiment thereof with reference to the attached drawings in which:

FIG. 10 shows the concept of the film image memory of the FIG. 7;

FIG. 11 shows the concept of the memory for image processing where the mean value of the four data units of FIG. 10 is stored;

DETAILED DESCRIPTION OF THE INVENTION

Figure 1:
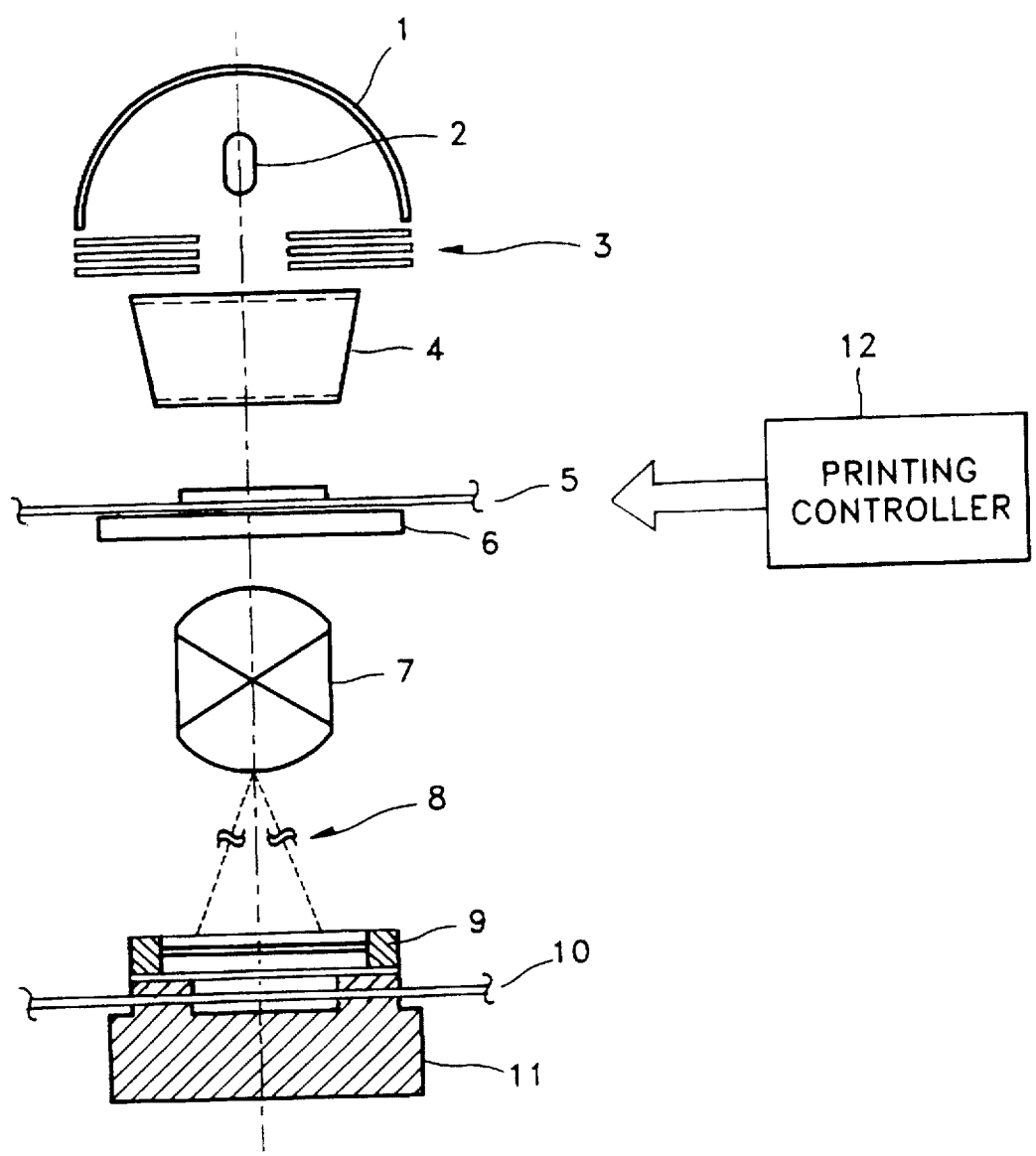
FIG. 1 is a schematic diagram for explaining the configuration of a conventional photographic printer.
Figure 2:
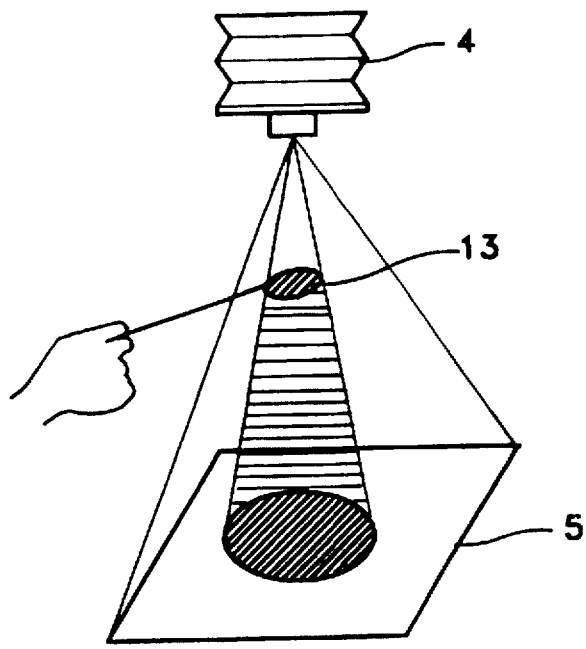
FIG. 2 is a diagram for explaining the burning with cover technique through a conventional manual operation.
Figure 3:
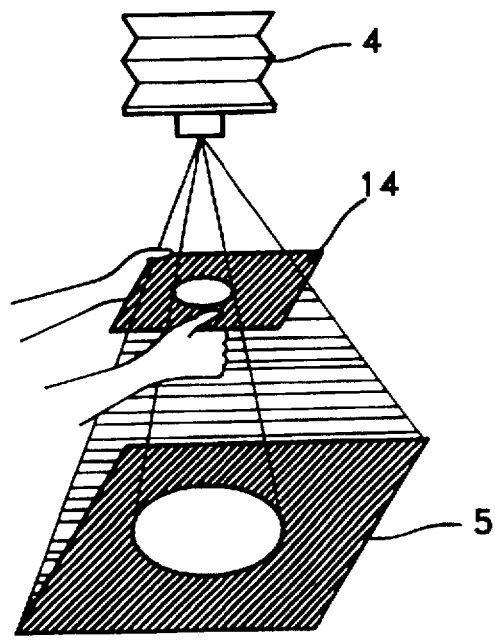
FIG. 3 is a diagram for explaining the burning and inserting technique through a conventional manual operation.
Figure 4:
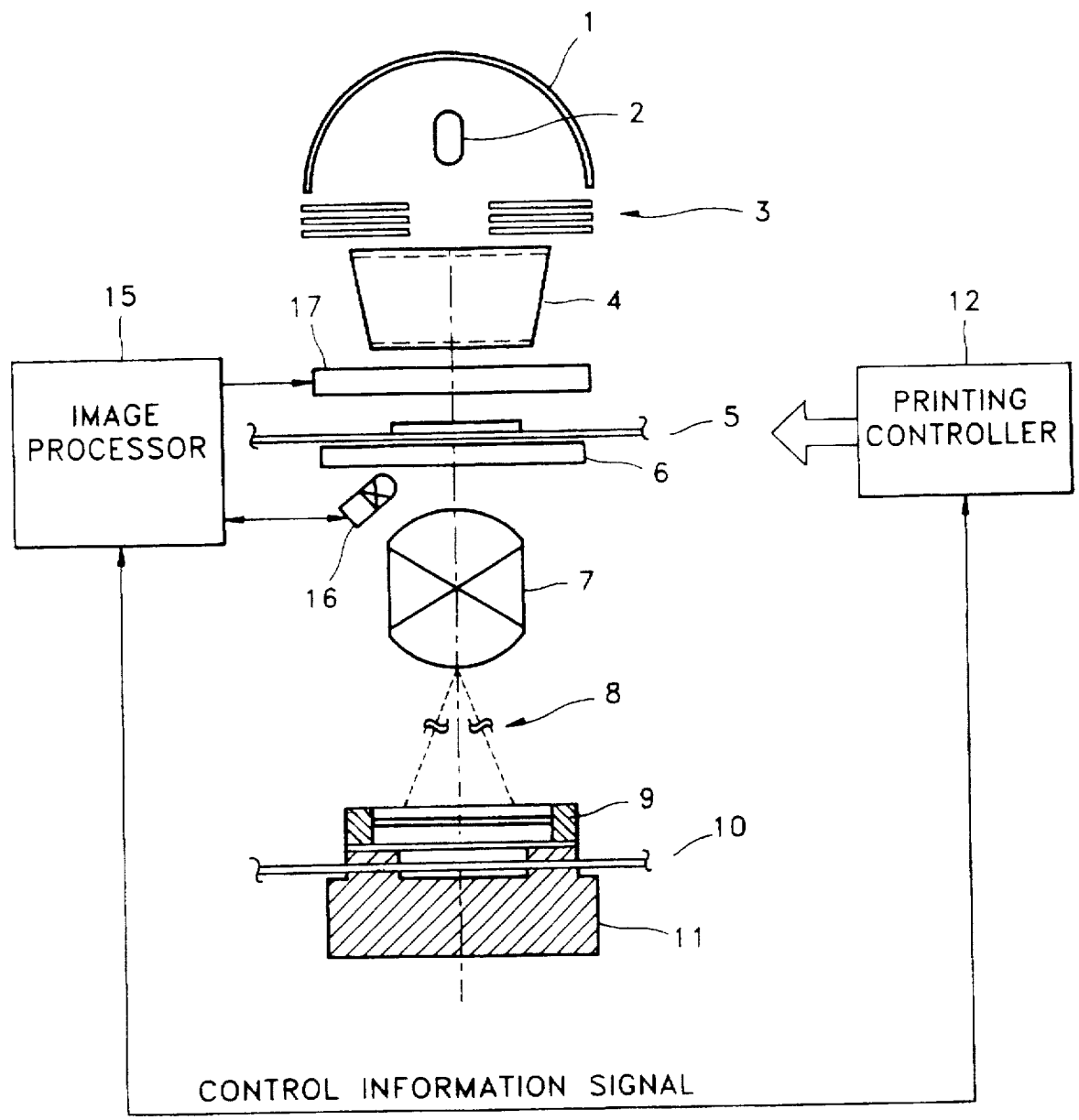
FIG. 4 is a schematic diagram illustrating a photographic printer according to one embodiment of the present invention.

FIG. 4 shows a photographic printer according to one embodiment of the present invention. In the drawing, the same reference numerals as those in FIG. 1 indicate the same elements having the same functions. Further to the structural elements of the apparatus in FIG. 1, the photographic printer of the present invention comprises an image processor 15 for processing a film information signal and generating a control signal therefor, a small video camera 16 for inputting information on a film 5 to the image processor 15 by detecting light passing through the film 5 and an image forming lens portion 7, an image display 17 for generating a variable shape between the light diffusing portion 4 and the film 5 in accordance with the control of the image processor 15. Between the image processor 15 and a printing controller 12, a control information signal is transmitted and received. For example, the image processor 15 indicates each controlling point of the printing controller 12. Accordingly, the printing controller 12 performs the control and informs the image processor 15 of the completion of control point. The information on the film 5 which is input from the video camera 16 to the image processor 15 is processed by a predetermined program in the image processor 15. The output signal corresponding to the result thereof controls the image display 17. That is, by performing feedback-control by processing the information on the film 5, partial exposure compensation, double exposure printing and index photographic processing can be performed automatically. It is preferable that in the present invention, a thin film transistor liquid crystal display (TFT LCD) is used as the image display 17, which will be described later.

Figure 5:
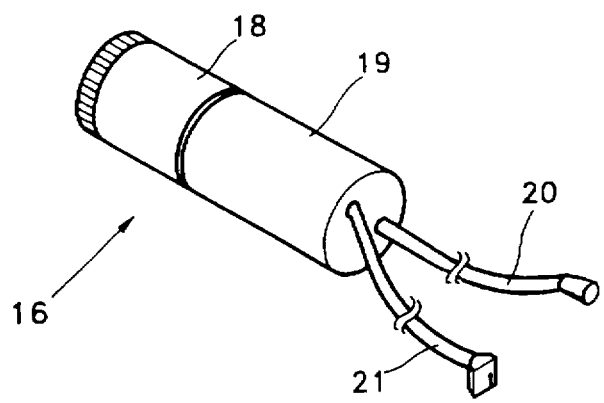
FIG. 5 shows a perspective view of a small video camera applied to the photographic printer of FIG. 4.
Figure 6:
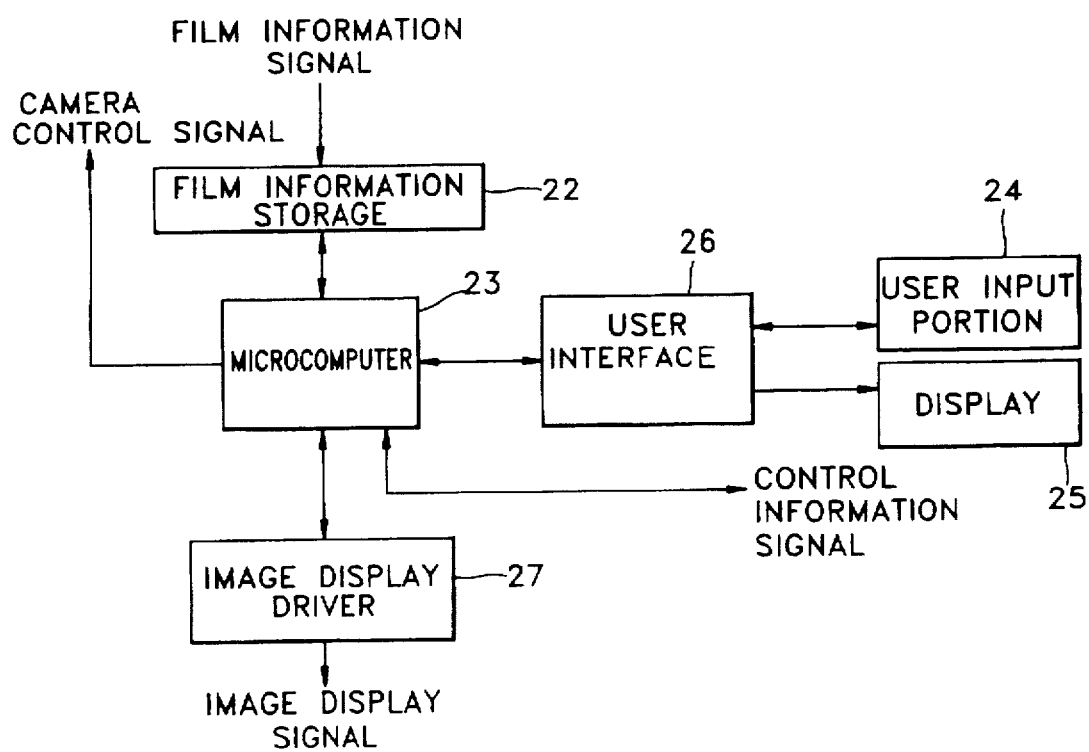
FIG. 6 is a block diagram showing the configuration of the image processing portion applied to the photographic printer of FIG. 4.

FIG. 5 is a perspective view of a small video camera 16 applied to the photographic printer of FIG. 4. The video camera 16 is comprised of a lens 18, an image pick-up portion 19, a power and control signal line 20 and a video signal output line 21. To output film information, a digital camera or a scanner can be used instead of the small video camera 16. An analog-to-digital converter should be included in the image processor 15 since the video camera 16 applied to the present embodiment outputs a combined video signal including a synchronizing signal and a blanking signal into an analog video signal. However, since the video camera or the scanner outputs a digital signal, the analog-to-digital converter is not necessary in the image processing portion (15 in FIG. 4). FIG. 6 schematically illustrates the configuration of the image processor 15 applied to the photographic printer of FIG. 4.

As shown in FIG. 6, the image processor 15 of the present embodiment is comprised of: a film information storage 22 for storing film information data obtained by processing a film information signal input; a microcomputer 23 for performing the entire control according to a built-in program or command of a user; a user input portion 24 for inputting data to the microcomputer 23 by the user; a display 25 for displaying the output data of the microcomputer 23; a user interface 26 for interfacing data between the microcomputer 23, the user input portion 24 and the display 25; and an image display driver 27 for generating an image display signal in accordance with the control of the microcomputer 23. The microcomputer 23 outputs a camera control signal and transmits/receives the control information signal to and from the printing controller 12 (FIG. 4). As the user input portion 24, a keyboard or a mouse can be used, and as the display 25, a cathode ray tube, a color picture tube or a liquid crystal display monitor can be used.

Figure 7:
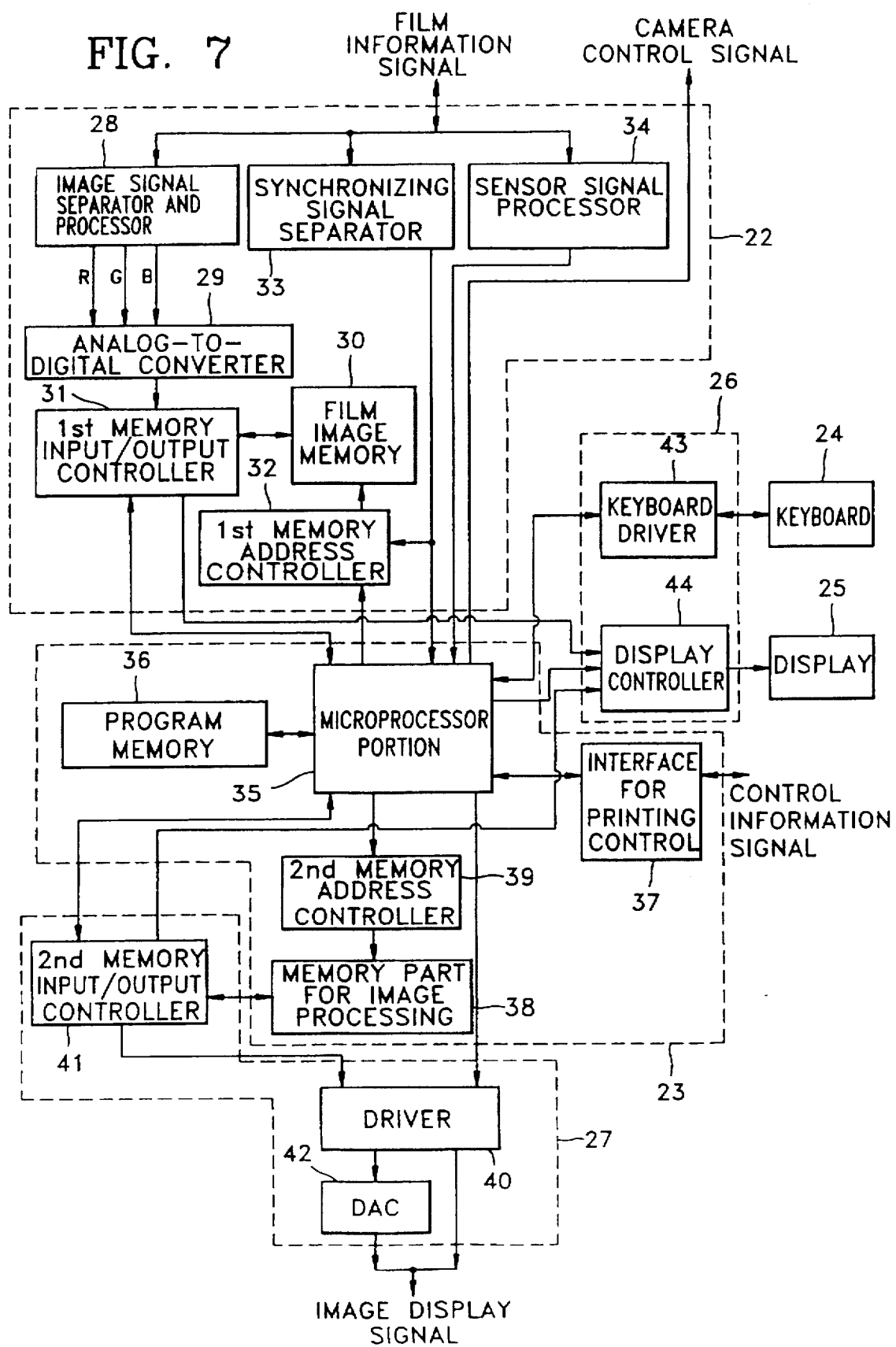
FIG. 7 is a detailed block diagram showing the configuration of the image processing portion applied to the photographic printer of FIG. 4.

FIG. 7 schematically illustrates the configuration of the image processor 15 applied to the photographic printer of FIG. 4 in greater detail. As shown in the drawing, the film information storage 22 is comprised of: an image signal separator and processor 28 for processing by separating an image signal from the film information signal output by the small video camera 16 (FIG. 4); an analog-to-digital converter 29 for converting the separated and processed image signal into a digital image data; a film image memory 30 for storing the digital image data; a first memory input/output controller 31 for controlling the input/output of the film image memory 30; a first memory address controller 32 for controlling an address by which the digital image data is to be stored in the film image memory 30, according to a synchronizing signal in the film information signal; a synchronizing signal separator 33 for separating the synchronizing signal from the film information signal; and a sensor signal processor 34 for processing the output signal of sensors which detect the loading of the film 5 (FIG. 4) and the printing paper 10 (FIG. 4) and converting the processed signal into a predetermined digital signal.

The image signal separator and processor 28 obtains an R, G and B or R-Y, B-Y and Y signals by clamping a direct current component of the separated image signal. The signals R, G, B, Y, R-Y and B-Y indicate a red signal, a green signal, a blue signal, a luminance signal, a red signal where the luminance component is removed, and a blue signal where the luminance component is removed, respectively. The synchronizing signal can be separately applied as being divided into a vertical synchronizing signal and a horizontal synchronizing signal, or applied as a combined synchronizing signal. The synchronizing signal output from the synchronizing signal separator 33 is applied to the first memory address controller 32, so that the image data is mapped in the film image memory portion 30.

The microcomputer 23 of FIG. 7 is comprised of: a microprocessor portion 35 provided with a microprocessor and peripheral equipments thereof; a program memory 36 for storing a program to be applied; an interface for printing control 37 used at the time of controlling the printing controller 12 (FIG. 4); a memory for image processing 38 for storing the output data processed in the microprocessor portion 35; and a second memory address controller 39 for controlling the address of the memory for image processing 38. The peripheral portion of the microprocessor portion 35 is provided with a clock generator and a reset portion (not shown). The program memory 36 is provided with a ROM and RAM and can be included in the microprocessor portion 35 in some cases. Also, the memory for image processing 38 can be combined with the film image memory 30 in the film information storage 22. The microprocessor applied to the microprocessor portion 35 can be replaced by a digital signal processor.

The image display driver 27 in FIG. 7 is comprised of: a driver 40 for generating an image display signal according to the control of the microcomputer 23; a second memory input/output controller 41 for controlling the input/output data of the image processing memory 38 in the microcomputer 23 and simultaneously inputting the image data to the driver 40; a digital-to-analog converter 42 for converting the digital signal output from the driver 40 into a predetermined analog signal. It is preferred that as the image display 17 (FIG. 4) a TFT LCD is employed, and in this case, the driver 40 can be divided into an LCD drive pulse generator and an LCD image signal generator. The digital-to-analog converter 42 can be omitted according to the characteristic of the image display 17 (FIG. 4) and the driver 40.

When the user input portion 24 is a keyboard, the user interface 26 in FIG. 7 is comprised of a keyboard driving portion 43 for converting the output signal of the keyboard 24 corresponding to the specifications of the microcomputer 23, and a display controller 44 for converting the output signal of the microcomputer 23 to a signal corresponding to the specification of the display 25, e.g., a combined image signal.

Figure 8:
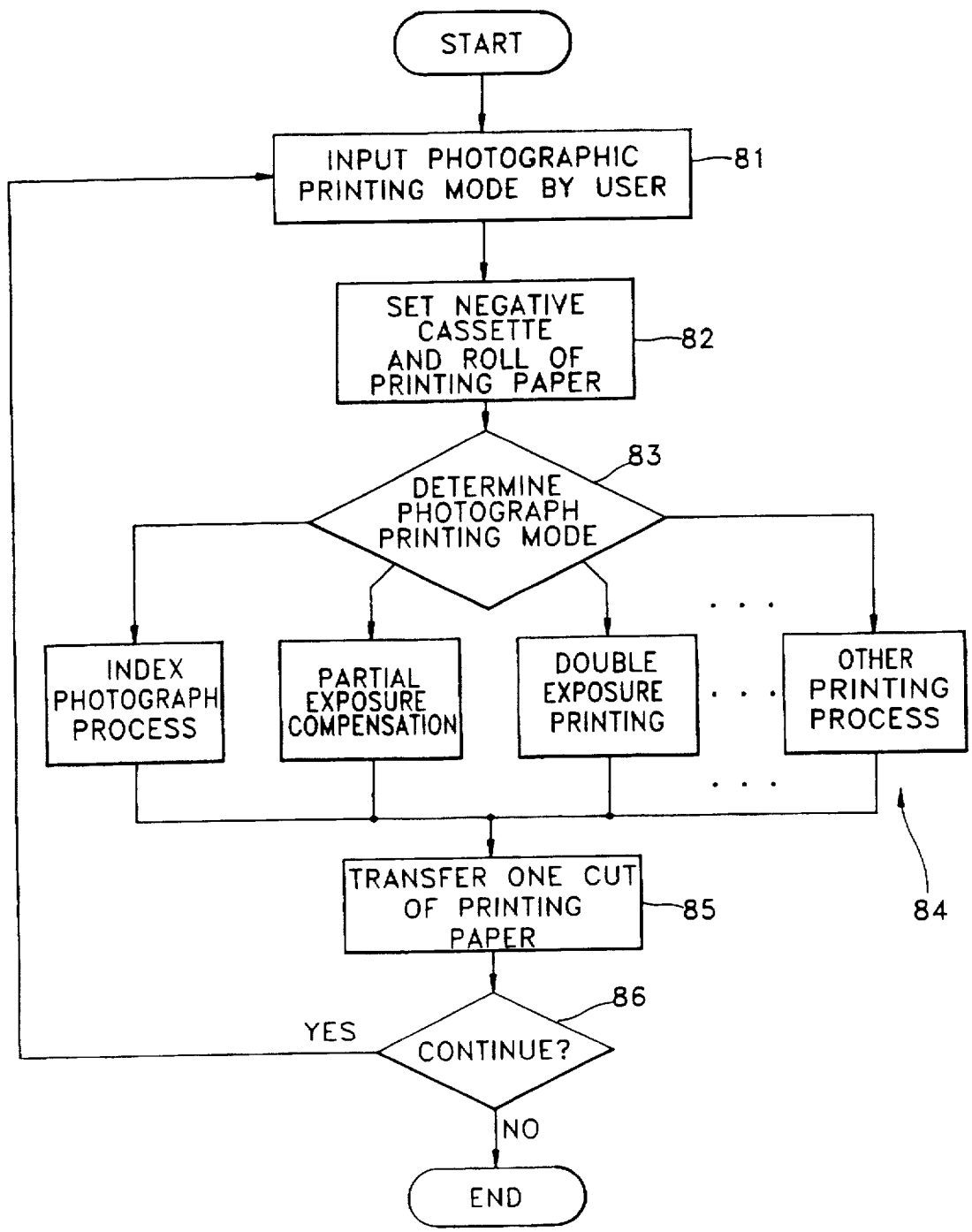
FIG. 8 is a flowchart for explaining basic algorithm included in the image processing portion of the photographic printer of FIG. 4.

FIG. 8 shows a flow chart for a basic algorithm which is included in the image processor of FIG. 4. When a photographic printing mode is selected by a user, in step 81, a film negative cassette and printing roll are set, in step 82. Based on input data, the printing mode is determined, in step 83, and printing is performed according to the algorithm of the corresponding printing mode, in step 84. The printing mode can be classified into index photograph processing, partial exposure compensation, double exposure printing or other printing processes. When the printing is completed according to the corresponding printing mode algorithm, one cut of the printing paper is transferred, in step 85. In step 86, a determination is made as to whether the printing work should continue. If a command to continue the printing is input, the above steps repeat, otherwise, the program ends.

Figure 9:
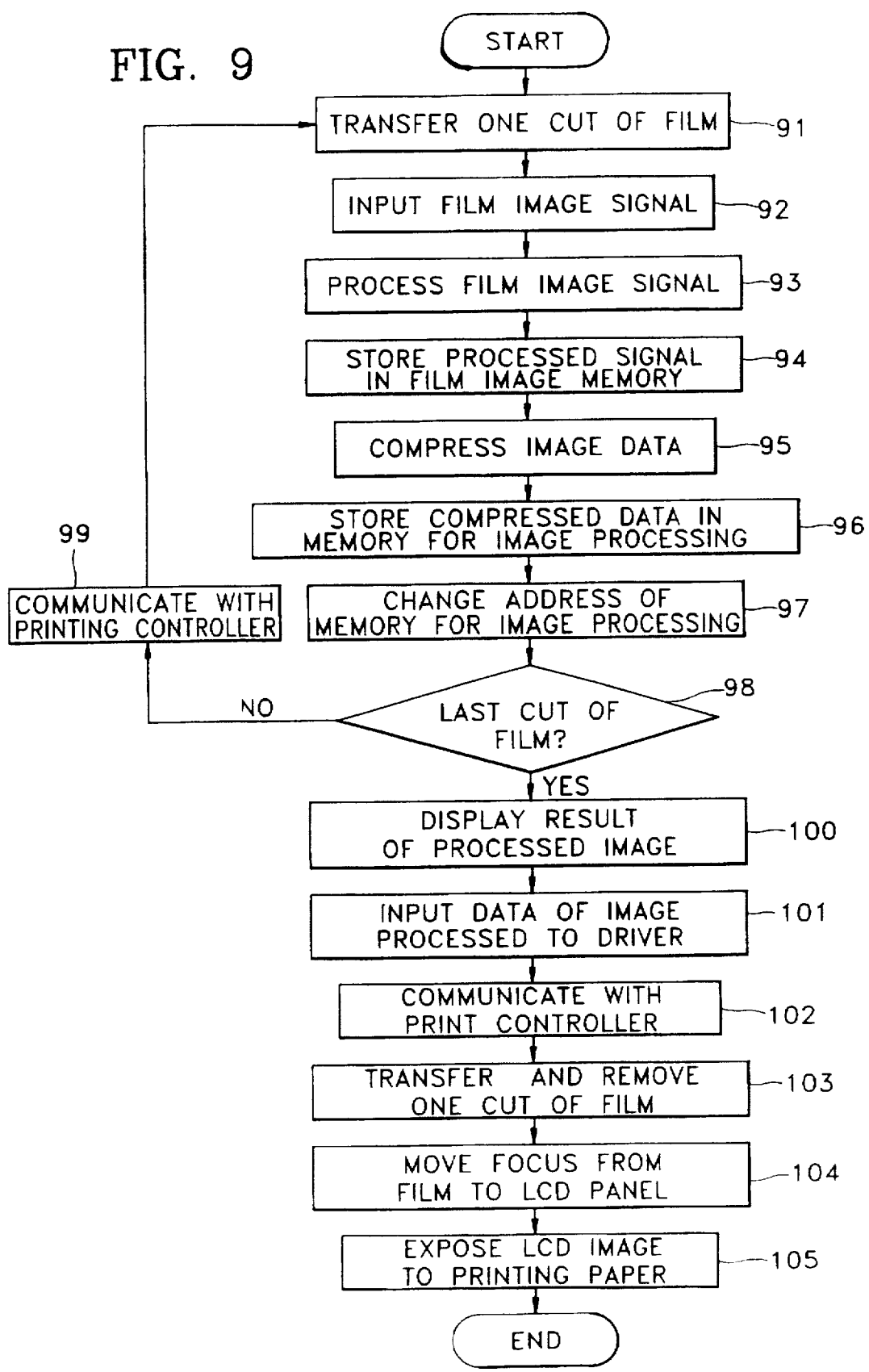
FIG. 9 is a flowchart for explaining the algorithm of the index photograph processing in FIG. 8.

FIG. 9 explains the algorithm of the index photograph processing of FIG. 8. After one cut of film is transferred, in step 91, the film image signal output from the video camera 16 is input to the film information storage 22, in step 92. The film image signal input is processed in the film information storage 22, in step 93, and the result thereof is stored in the film image memory 30, in step 94. Then, the data stored in the film image memory 30 is processed through a predetermined image data compression technique in the microcomputer 23, in step 95, and the result is stored in the memory for image processing 38, in step 96. After the address of the memory for image processing 38 is changed, in step 97, a determination is made as to whether the film applied is the last cut of the film, in step 98. If the film applied is not the last film cut, the above steps are repeated by controlling the printing controller 12 (FIG. 4), in step 99. When the film applied is the last cut, the image processing result is displayed on the display 25, in step 100. The result data is input to the driver 40, in step 101. After the one cut of the film 5 used in controlling the printing controller 12 is transferred and removed, the focus of the image forming lens portion 7 is transferred from the film 5 to the image display 17, i.e., an LCD panel, in step 104. By exposing the image of the LCD 7 (FIG. 4) to the printing paper 10, a plurality of photographs can be printed in a compressed state, in step 105.

In FIG. 10, the concept of the film image memory of FIG. 7 is shown. As shown in FIG. 10, four image data units are stored in the film image memory 30 according to the corresponding address area. That is, the data D (0000) of an address 0000 is 5; the data D (0001) of address 0001 is 10; the data D (0100) of address 0100 is 20; and the data D (0101) of address 0101 is 5. The mean value of the four data units is stored in the memory for image processing 38 to print a photograph reduced to ¼ by using an average method which is one of image data compression techniques.

Namely, in FIG. 10, the mean value of the four data units is {D(0000)+D(0001)+D(0100)+D(0101)}/4=(5+10+20+5)/4=40/4=10. FIG. 11 shows the concept of the memory for image processing 38 where the mean value of the four data units of FIG. 10. As shown in FIG. 11, it is noted that the above mean value is stored at the address 0000 of the memory for image processing 38. Thus, the index photograph processing can be performed by storing the data processed using the image data compression in the memory for image processing 38.

Figure 12:
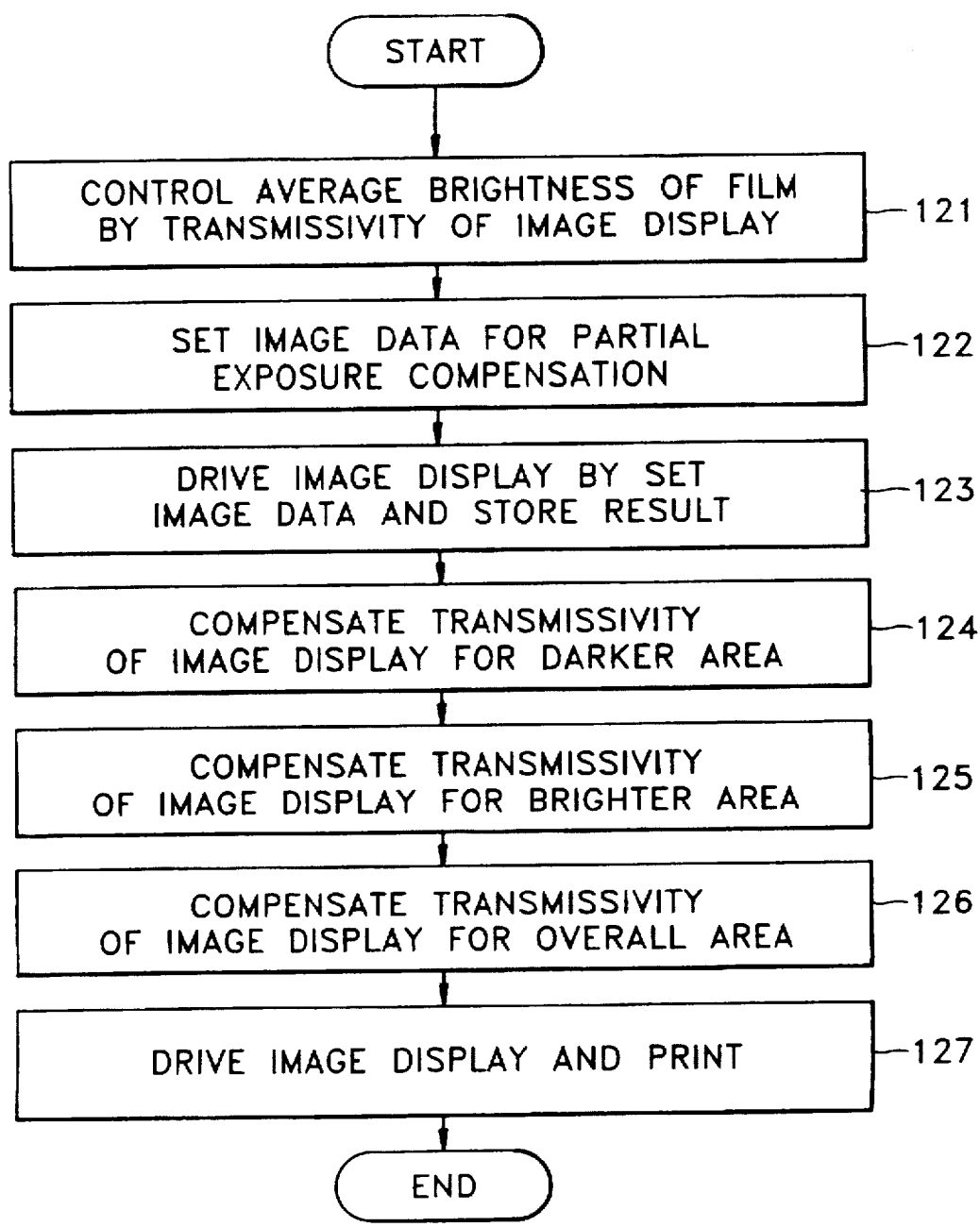
FIG. 12 is a flowchart for explaining the algorithm of the partial exposure compensation of FIG. 8.

In FIG. 12, the algorithm of the partial exposure compensation of FIG. 8 is shown. As shown in FIG. 12, the algorithm of the partial exposure compensation according to the present embodiment is largely divided into 7 steps. That is, a step 121 in which the average brightness of the film 5 is controlled with the transmissivity of the image display 17; a step 122 in which image data for partial exposure compensation is set according to a predetermined reference value; a step 123 in which the image display 17 is driven according to the set image data and the result thereof is stored; a step 124 in which the transmissivity of the image display 17 with respect to a relatively dark portion is compensated by checking the above result; a step 125 in which the transmissivity of the image display 17 with respect to a relatively bright portion is compensated; a step 126 in which the transmissivity of the overall portion of the image display 17 is compensated; and a step 127 in which the image display 17 is driven and a printing operation is performed.

Figure 13:
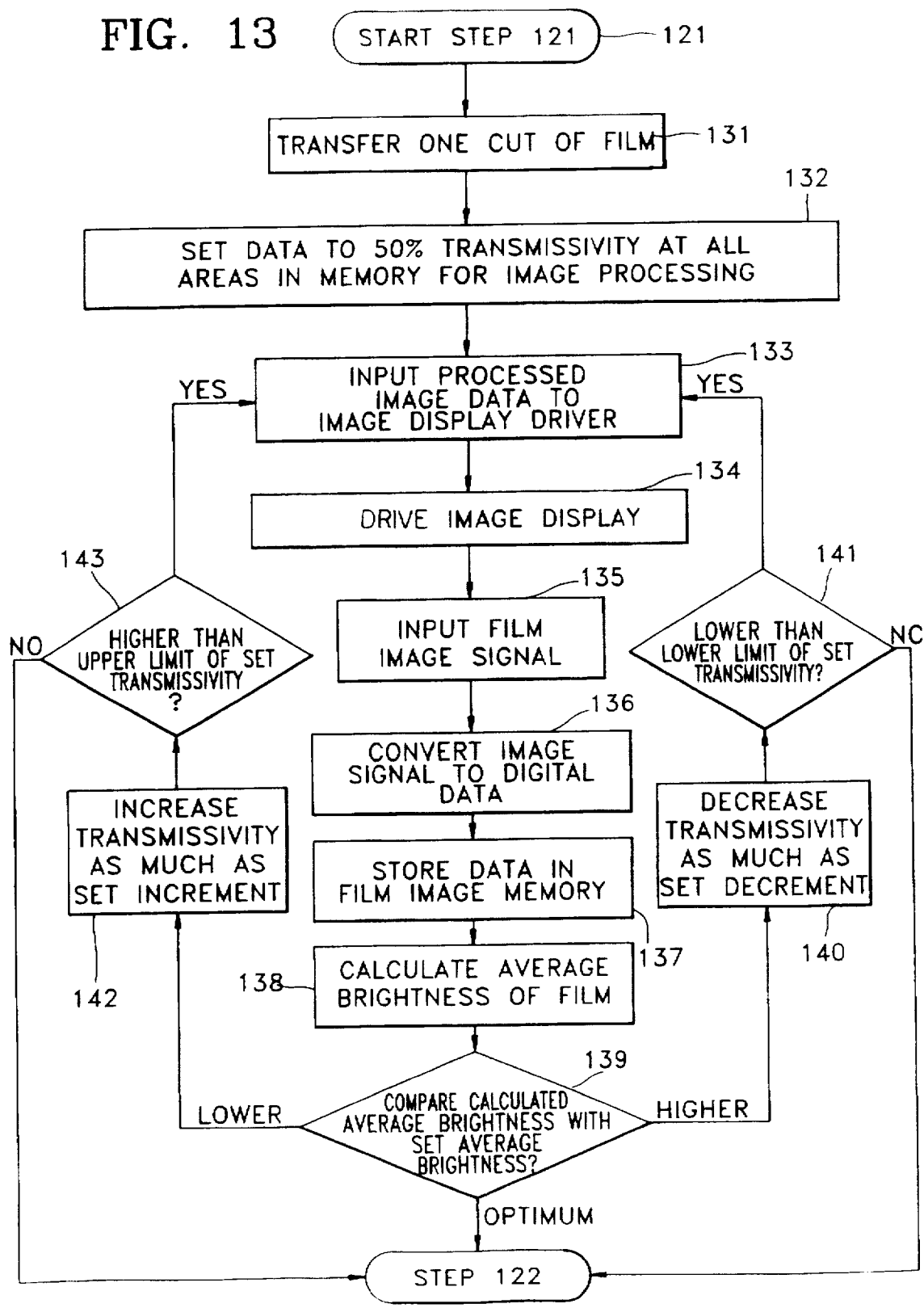
FIG. 13 is a flowchart detailing the step 121 of FIG. 12.

FIG. 13 details the step 121 of FIG. 12. First, after one cut of the film negative 5 is transferred, in step 131, the data of the initial transmissivity is set at all areas of the memory for image processing 38, in step 132. In the present embodiment, a transmissivity of 50% is set as the initial transmissivity. Then, image processing data is input to the image display driver 27, in step 133, and the image display 17 is driven, in step 134. Next, a film image signal of 50% transmissivity is input with the small video camera 16, in step 135. The film image signal input is converted into digital data in the film information storage 22, in step 136, and stored in the film image memory 30, in step 137. In step 138, the average brightness of the corresponding film 5 is calculated by obtaining the average of the data stored in the film image memory 30. Then, the calculated average brightness of the corresponding film 5 is compared with the set average brightness, in step 139. If the comparison result is equal, the program goes to the step 122 of FIG. 12, and if not, the calculated average brightness is controlled. That is, when the calculated average brightness is higher than the set average brightness, the transmissivity of the image display 17 is lowered by a set decrement, in step 140. At this stage, a determination is made as to whether the lowered transmissivity is lower than that of the set lower limit, in step 141. If it is determined to be lower than the lower limit, the program goes to the step 133, and if not, the program it goes to the step 122 of FIG. 12. When the average brightness calculated in the step 139 is lower than the set average brightness, the transmissivity of the image display 17 is increased by a set increment, in step 142. At this stage, a determination is made as to whether the increased transmissivity is higher than that of the set upper limit, in step 143. If the transmissivity is determined to be higher, the program goes to the step 133, and if not, the program goes to the step 122 of FIG. 12. In this way, the average brightness of the film 5 can be controlled by the transmissivity of the image display 17.

Figure 14:
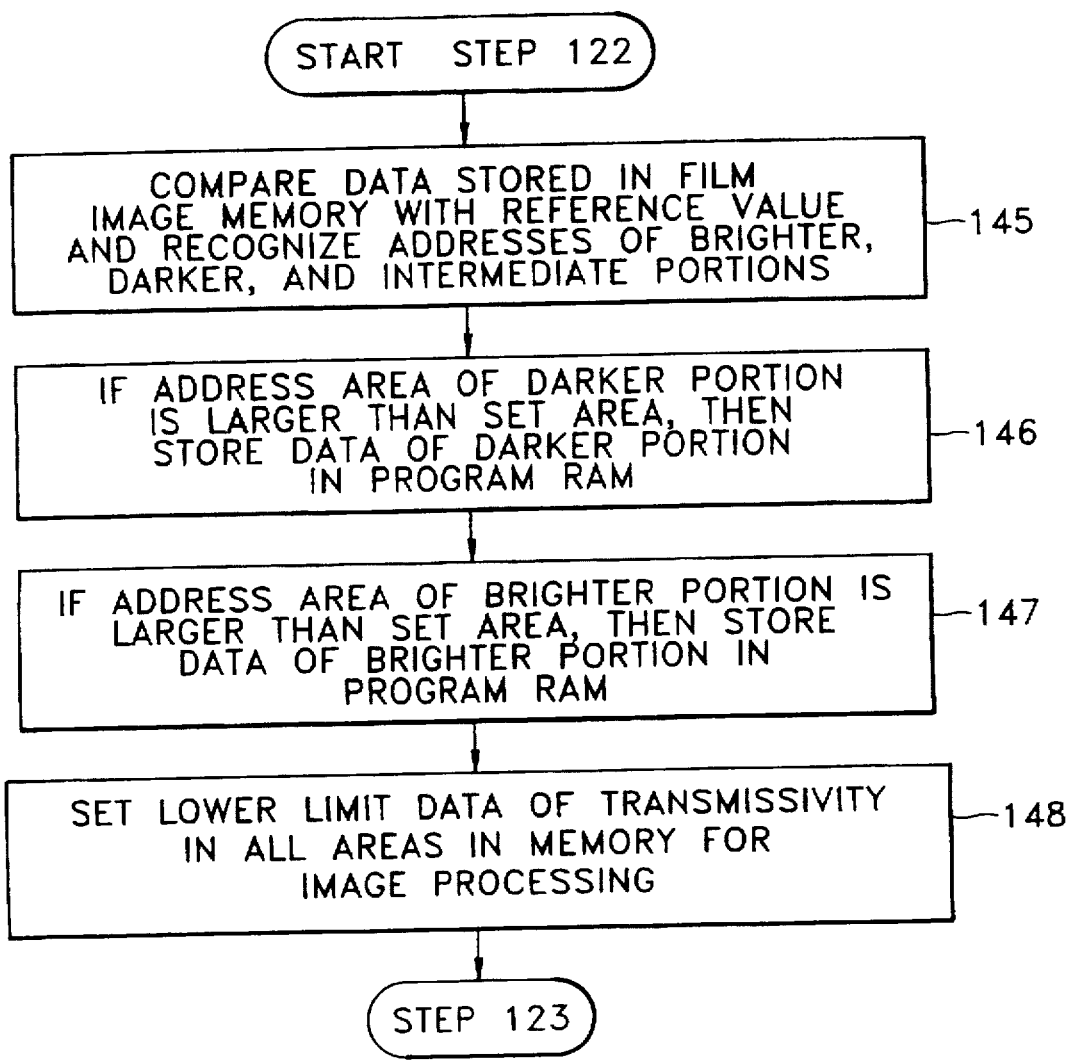
FIG. 14 is a flowchart detailing the step 122 of FIG. 12.

FIG. 14 details the step 122 of FIG. 12. First, the data stored in the film image memory 30 is compared with a predetermined reference value and the addresses of a brighter portion, a darker portion and an intermediate portion are recognized, in step 145. When the address area of the darker portion is larger than that of the set portion, the data of the darker portion is stored in the RAM of the program memory 36, in step 146. When the address area of the brighter portion is larger than that of the set area, the data for the brighter portion is stored in the RAM of the program memory 36, in step 147. The data of the minimum transmissivity is set in the whole area of the memory for image processing 38, in step 148, and the program goes to the step 123 of FIG. 12.

Figure 15:
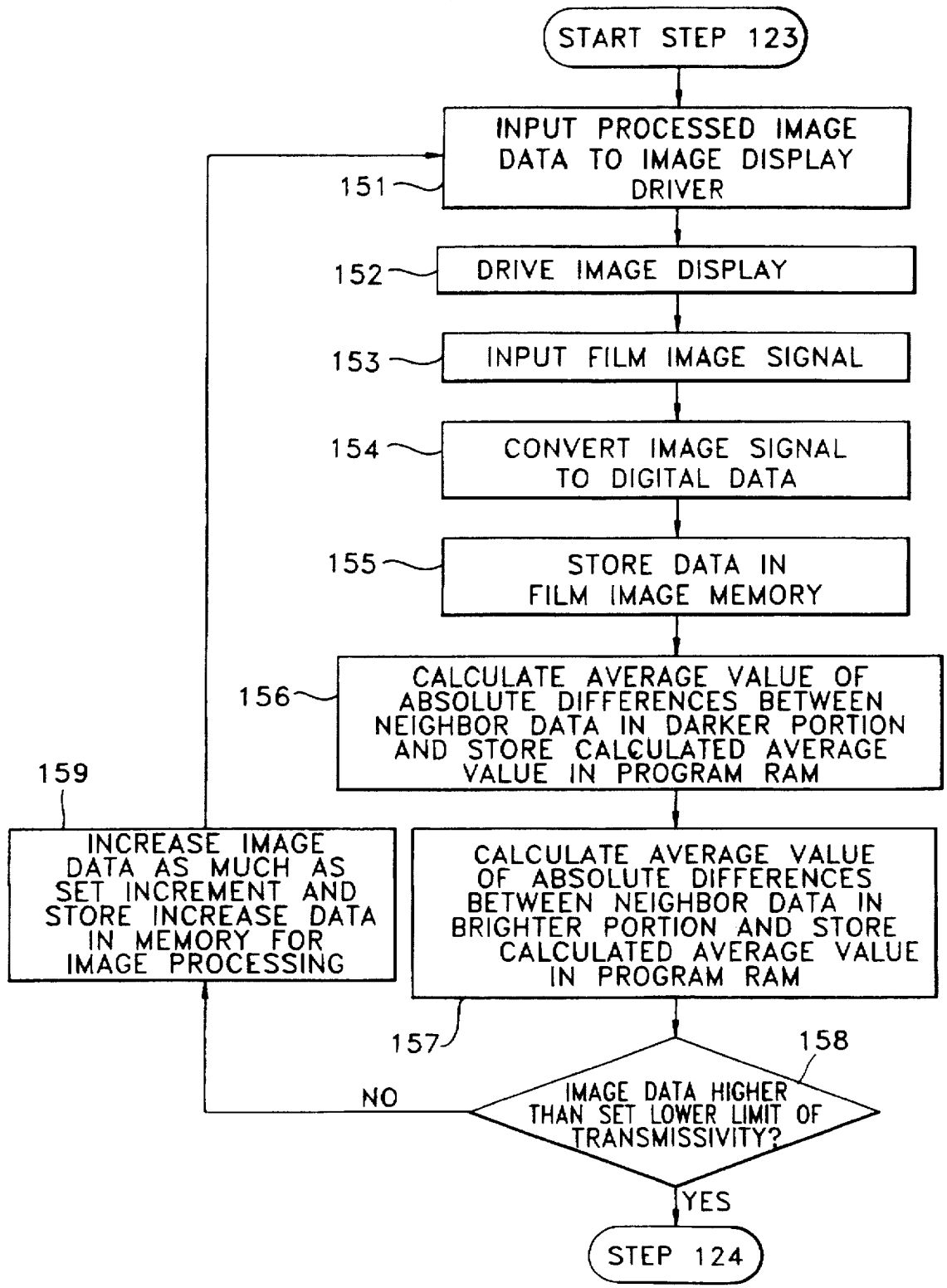
FIG. 15 is a flowchart detailing the step 123 of FIG. 12.

FIG. 15 details the step 123 of FIG. 12. First, image processing data is input to the driver 40 in the image display drive portion 27, in step 151, and the image display 17 is driven, in step 152. Next, a film image signal is input by the small video camera 16, in step 153. The film image signal input is converted to digital data in the film information storage 22, in step 154 and then stored in the film image memory 30, in step 155. Then, difference values between adjacent data in the address area of the darker portion are obtained and the average difference value with respect to the absolute value of each difference value is stored in the RAM of the program memory 36, in step 156. In the same way, difference values between data in the address area of the brighter portion are obtained and the average difference value with respect to the absolute value of each difference value is stored in the RAM of the program memory, in step 157. Next, a determination is made as to whether the data stored in the memory for image processing 38 is higher than the set lower value, in step 158. If the value is determined to be higher, the program goes to the step 124 of FIG. 12, and if not, the stored data is controlled to be higher than the lower value. That is, the data stored in the memory for image processing 38 is compared with the minimum transmissivity data set in the step 122 of FIG. 14. If the comparison result is not higher than the minimum transmissivity, the stored data is increased as much as the set increment and stored in the memory for image processing 38, in step 159. By repeating the process of the step 123, the data stored in the memory for image processing 38 is controlled to be higher than the set minimum transmissivity data.

Figure 16:
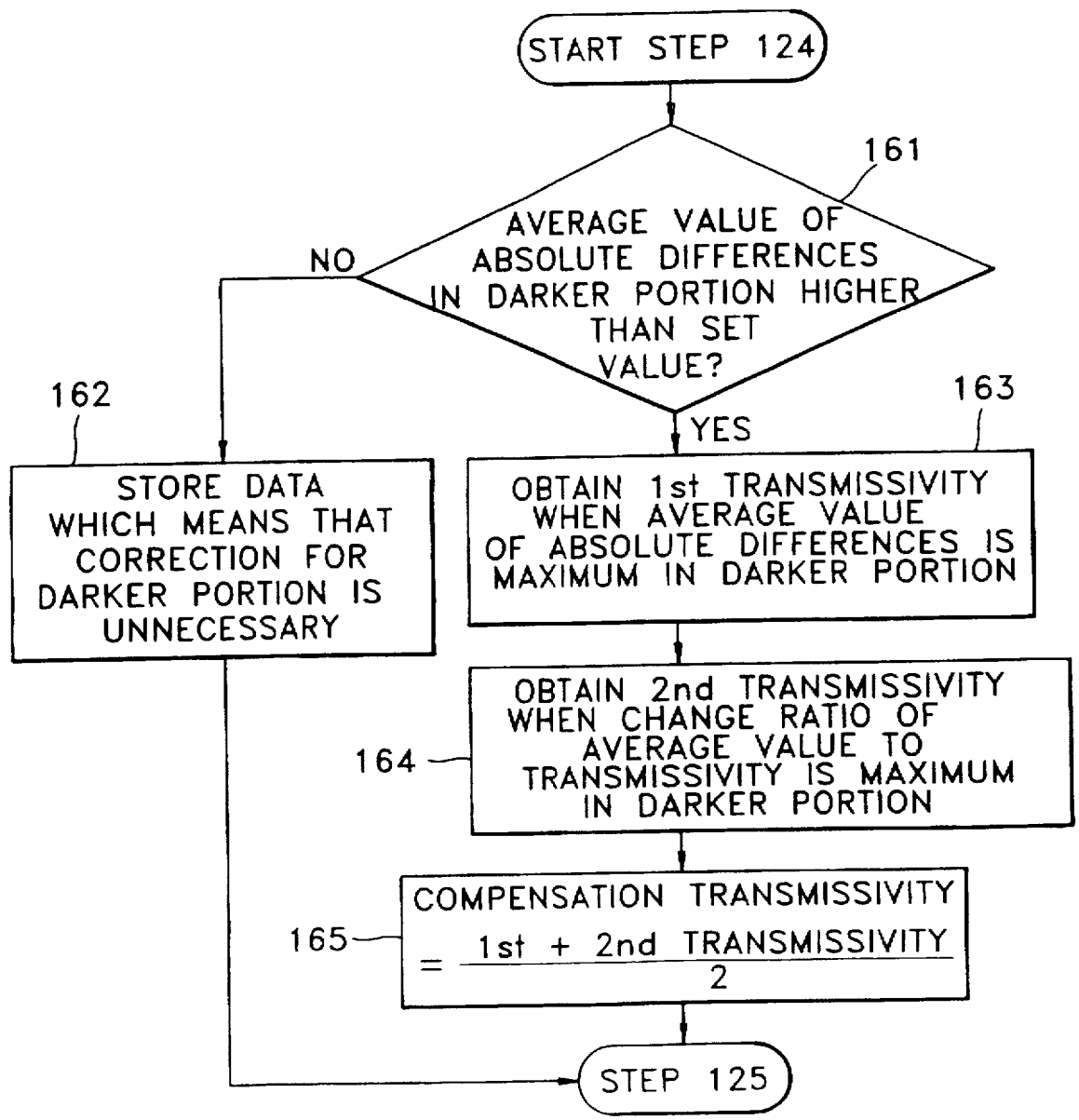
FIG. 16 is a flowchart detailing the step 124 of FIG. 12.

FIG. 16 details the step 124 of FIG. 12. First, a check is made to see whether the compensation of the darker portion has peen performed, in step 161. That is, in the address area of the darker portion, a determination is made as to whether the average difference value is higher than the set difference value according to the corresponding transmissivity. If it is determined to be lower, the data is stored in a state where the compensation of the darker portion is not performed, in step 162, and if higher, the compensation of the darker portion is performed. To perform the compensation of the darker portion, the transmissivity when the average difference value is maximum in the address area of the darker portion is obtained, in step 163. Also, the transmissivity when the average difference value varies at its maximum with respect to transmissivity change in the address area of the darker portion is obtained, in step 164. The midway value between the above two transmissivities, i.e., the transmissivities when the average difference value is maximum and varies at its maximum is obtained and set as the compensation transmissivity, in step 165. In this way, the transmissivity of the image display 17 with respect to the relatively dark portion is compensated and the program goes to the step 125 of FIG. 12.

Figure 17:
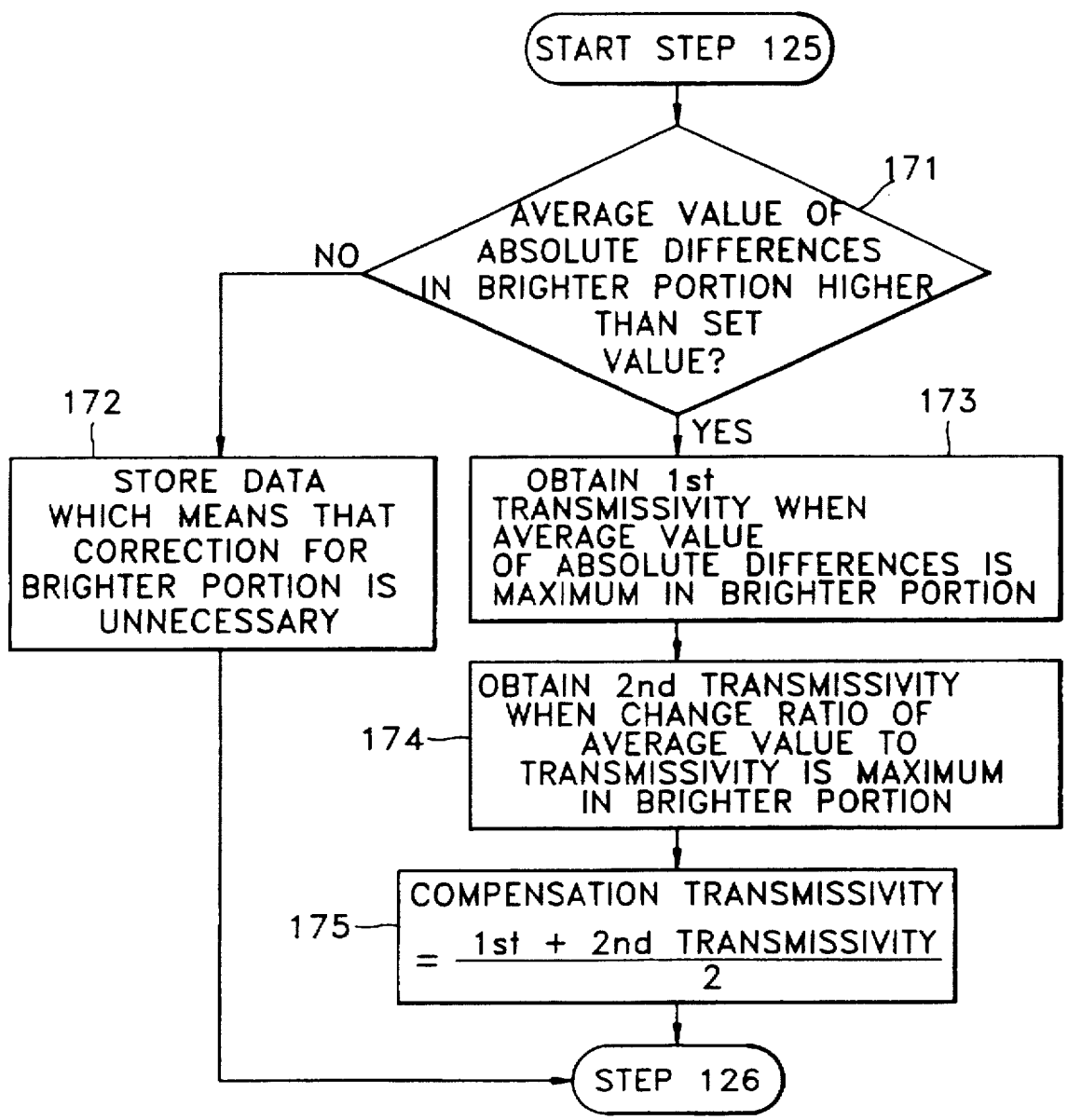
FIG. 17 is a flowchart detailing the step 125 of FIG. 12.

FIG. 17 details the step 125 of FIG. 12. First, in step 171, a check is made as to whether the compensation of the brighter portion has been performed. That is, in the address area of the brighter portion, a determination is made as to whether the average difference value is higher than the set difference value according to the corresponding transmissivity. If it is determined to be lower, the data is stored in a state where the compensation of the brighter portion is not performed, in step 172, and if higher, the compensation of the brighter portion is performed. To perform the compensation of the brighter portion, the transmissivity when the average difference value is maximum in the address area of the brighter portion is obtained, in step 173. Also, the transmissivity when the average difference value varies at its maximum with respect to transmissivity change in the address area of the brighter portion is obtained, in step 174. The midway value between the above two transmissivities, i.e., the transmissivities when the average difference value is maximum and varies at its maximum is obtained and set as the compensation transmissivity, in step 175. In this way, the transmissivity of the image display 17 with respect to the relatively bright portion is compensated and the program goes to the step 126 of FIG. 12.

Figure 18:
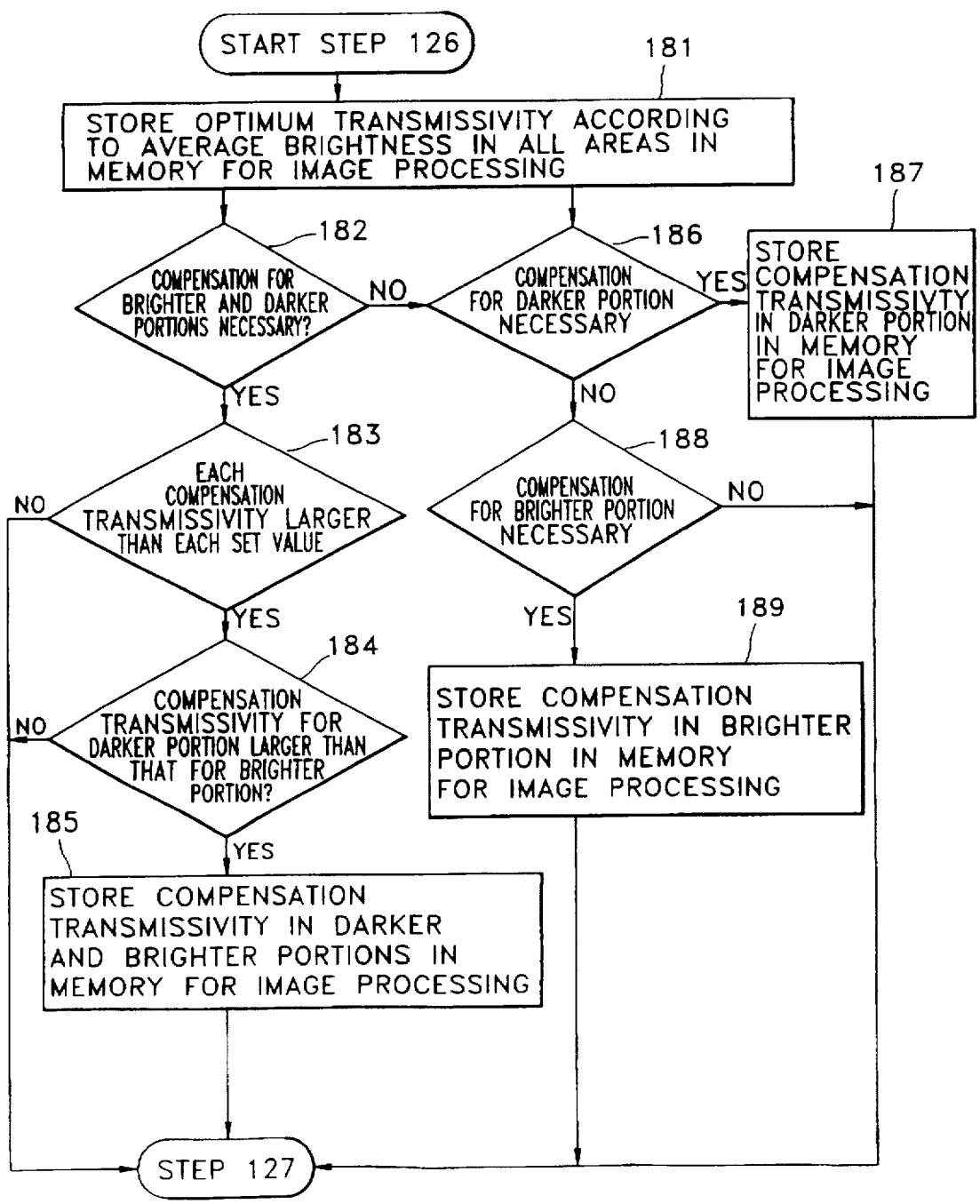
FIG. 18 is a flowchart detailing the step 126 of FIG. 12.

FIG. 18 details the step 126 of FIG. 12. First, the optimum transmissivity with respect to the average brightness is stored in all areas of the memory for image processing 38, in step 181. Next, a determination is made as to whether compensation for the brighter portion and the darker portion is concurrently necessary, in step 182. When concurrent compensation is required, the compensation transmissivity of the darker portion and that of the brighter portion are compared with the set value, in step 183. If it is determined not to be larger than the set value, the program goes to the step 127 of FIG. 12 without the compensation, and if it is determined to be larger, the concurrent compensation is performed. To perform the concurrent compensation, the compensation transmissivity of the darker portion is compared with that of the brighter portion, in step 184. If it is determined not to be larger than the brighter portion, the step 127 of FIG. 12 is performed in a state where the compensation is not performed, and if it is determined to be larger, the compensated transmissivity is stored in the corresponding address area, in step 185. That is, the corresponding transmissivity is stored in the address areas of the darker portion and the brighter portion of the memory for image processing 38. When concurrent compensation is not required in the step 182, a determination is made as to whether compensation for the darker or brighter portion is necessary, in steps 186 and 188. If the compensation is not required, the program goes to the step 127 of FIG. 12, and if compensation is required, the program goes to the step 127 after the corresponding compensation transmissivity is stored in the address area of the darker or brighter portion, in steps 187 and 189. In this way, the transmissivity can be compensated with respect to the overall area of the image display 17.

Figure 19:
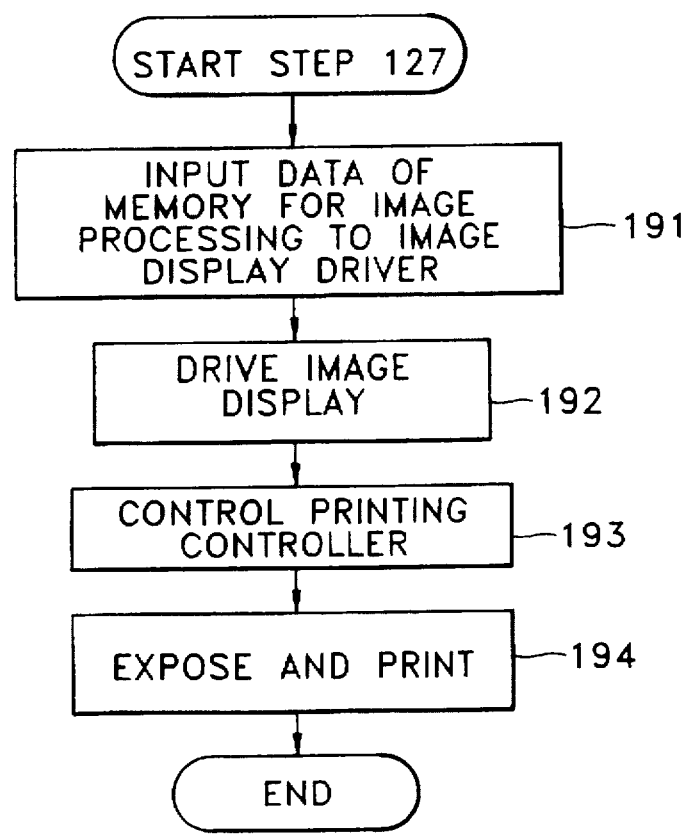
FIG. 19 is a flowchart detailing the step 127 of FIG. 12.

FIG. 19 details the step 127 of FIG. 12. The data of the memory for image processing 38 is input to the driver 40 in the image display driver 27, in step 191, and the image display 17 is driven, in step 192. Then, by controlling the printing controller i2, in step 193, exposure and printing are performed, in step 194. Accordingly, the partial exposure compensation can be automatically performed on the printing paper 10 according to the algorithm of FIG. 12.

Figure 20:
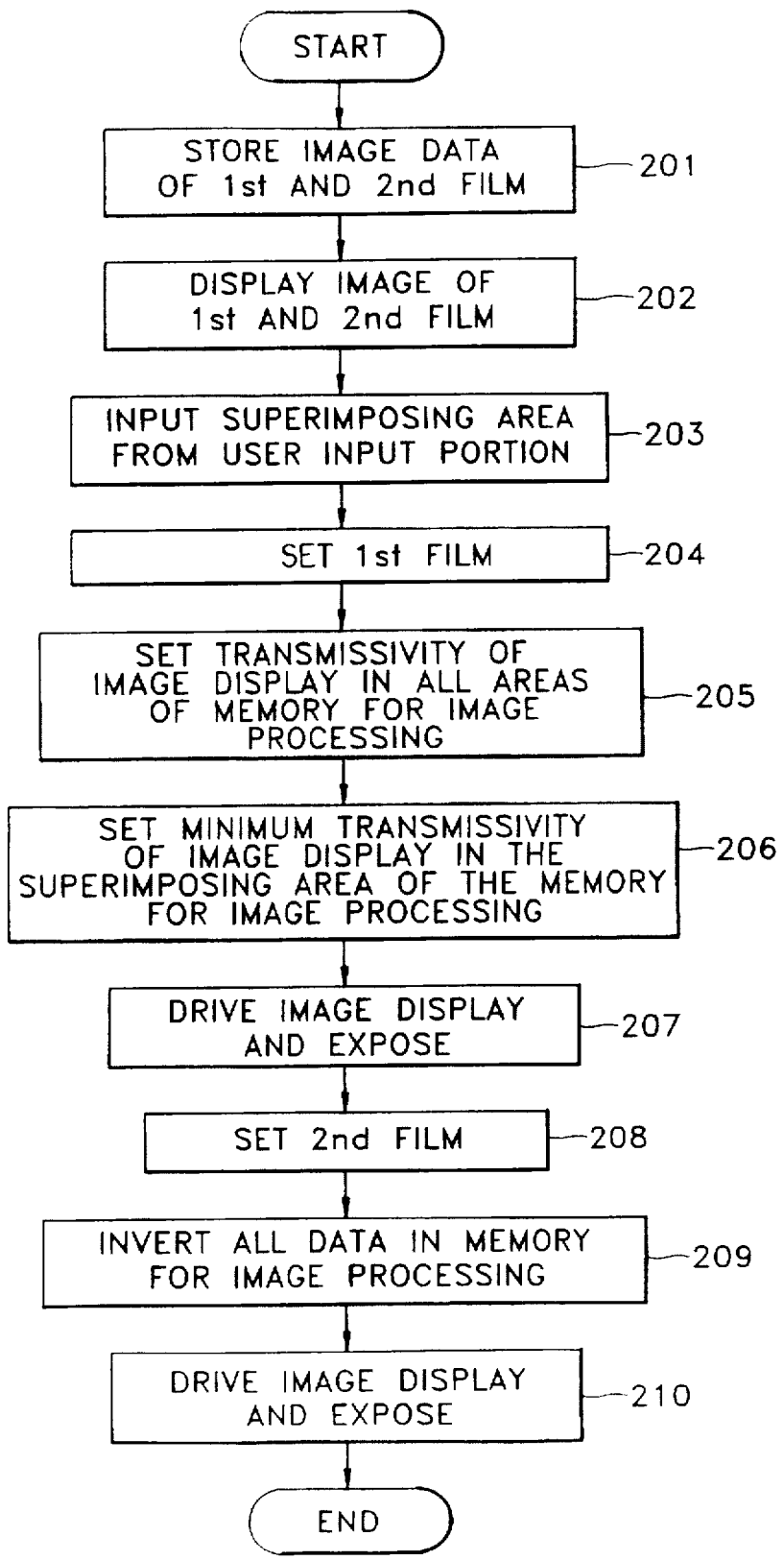
FIG. 20 is a flowchart for explaining the algorithm of the double exposure printing of FIG. 8.

FIG. 20 details the algorithm of double exposure printing. First, the image data of the first and second films are processed, respectively, and stored in the memory for image processing 38, in step 201. The first film is to be the background and the second film is to be double-exposed.

Next, the image of the first and second films appear on the display 25, in step 202. That is, the data stored in the memory for image processing 38 is input to the display controller 44 and the images of the two films are displayed on the display 25. Also, a message of inputting areas which will be superimposed is displayed. Thus, when the superimposing areas are input by a user through the user input portion, e.g., the keyboard 24 or the mouse, the superimposed double image is displayed on the display 25 and the data of the areas to be superimposed is stored, in step 203. Then, a message of loading the first film is displayed on the display 25 to load the first film, in step 204. The minimum transmissivity of the image display 17 is set in the overall area of the memory for image processing 38, in step 205. The minimum transmissivity of the image display 17 is set in the superimposing area of the memory for image processing 38, in step 206. Then, the data of the memory for image processing 38 is input to the driver 40 in the image display drive portion 27 and the image display 17 is driven, in step 207. At this stage, the exposure and printing are performed by controlling the printing controller 12. Next, a message of loading the second film is displayed on the display 25 to load the second film, in step 208. All the data stored in the memory for image processing 38 is inverted, in step 209. After the data of the memory for image processing 38 is input to the driver 40 in the image display driver 27, the image display 17 is driven. At this stage, the exposure and double printing are performed by controlling the printing controller 12, in step 210.

Figure 21:
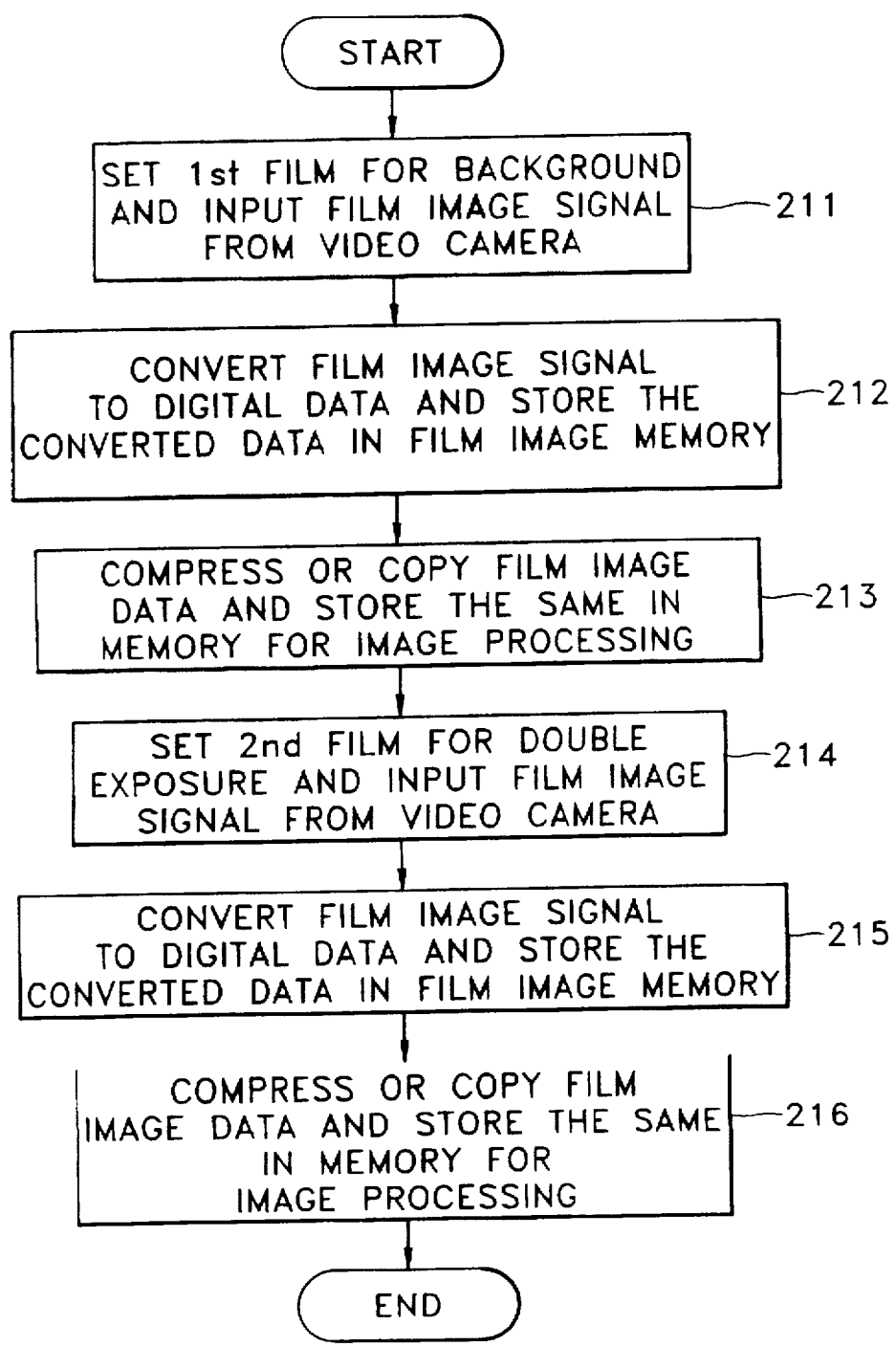
FIG. 21 is a flowchart detailing the step 201 of FIG. 20.

FIG. 21 details the step 201 of FIG. 20. First, in step 211, a message of loading the first film is displayed on the display 25 to load the first film. The image signal of the first film is input through the small video camera 16. The input image signal of the first film is converted into digital data in the film information storage 22 and then stored in the film image memory 30, in step 212. Next, the stored film image data is stored in the memory for image processing 38 as it is or in a compressed state, in step 213. When the image data of the first film is stored, a message of loading the second film is displayed on the display 25 to load the second film, in step 214. The image signal of the second film is input through the small video camera 16. The input image signal of the second film is converted to digital data in the film information storage 22 and then stored in the film image memory 30, in step 215. Next, the stored film image data is stored in the memory for image processing 38 as it is or in a compressed state, in step 216. Thus, the double exposure printing can be performed automatically by performing the steps 202 through 210.

Figure 22:
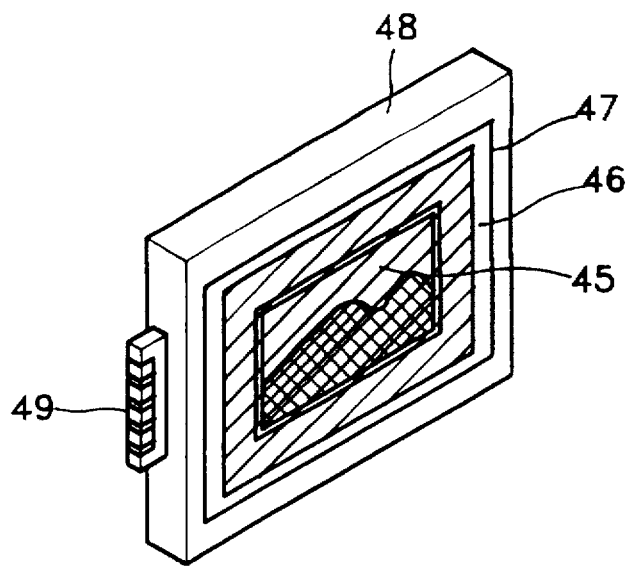
FIG. 22 illustrates a TFT LCD image display applied to the present embodiment.

In FIG. 22, a TFT LCD image display applied to the present embodiment is illustrated. In the drawing, there is included a TFT LCD panel 45, a polarizing filter 46, an infrared removing filter 47, a metal case 48 and a connector 49 which is connected to the output port of the image display driver 27. In the present embodiment, a dot-matrix type TFT LCD panel 45 is applied for the LCD display type. The matrix driving method of the dot-matrix type TFT LCD is largely divided into a simple matrix driving method and an active matrix driving method. The simple matrix driving method in which a voltage averaging method is mainly used has defects in that the number of the scanning electrodes are increased and the display view angle becomes narrower according as the number of pixels is increased. Also, in the simple matrix driving method, since the effective voltage difference between a selected pixel and a non-selected pixel is relatively small, contrast may become low when the method is applied to the image display 17 of the present embodiment. Therefore, in the present embodiment, the active matrix driving method which improves upon the above problems of the simple matrix driving method is adopted.

Figure 23:
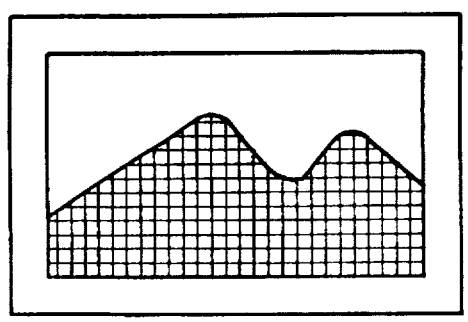
FIG. 23 shows an example of a transmissivity mask implemented by the TFT LCD image display of FIG. 22.

In the active driving method, called a separate switch matrix driving method, pixel liquid crystal cells equidistantly arrayed along column and row matrices are sequentially driven. FIG. 23 shows an example of a transmissivity mask implemented by the TFT LCD image display of FIG. 22. When the active matrix driving method is applied to the present embodiment, the opening and shutting function to the light is possible with tens or hundreds of thousands pixels so that a mask shape of the image display is freely implemented. When a color TFT LCD is employed as the image display 17, color control is possible in printing.

Figure 24:
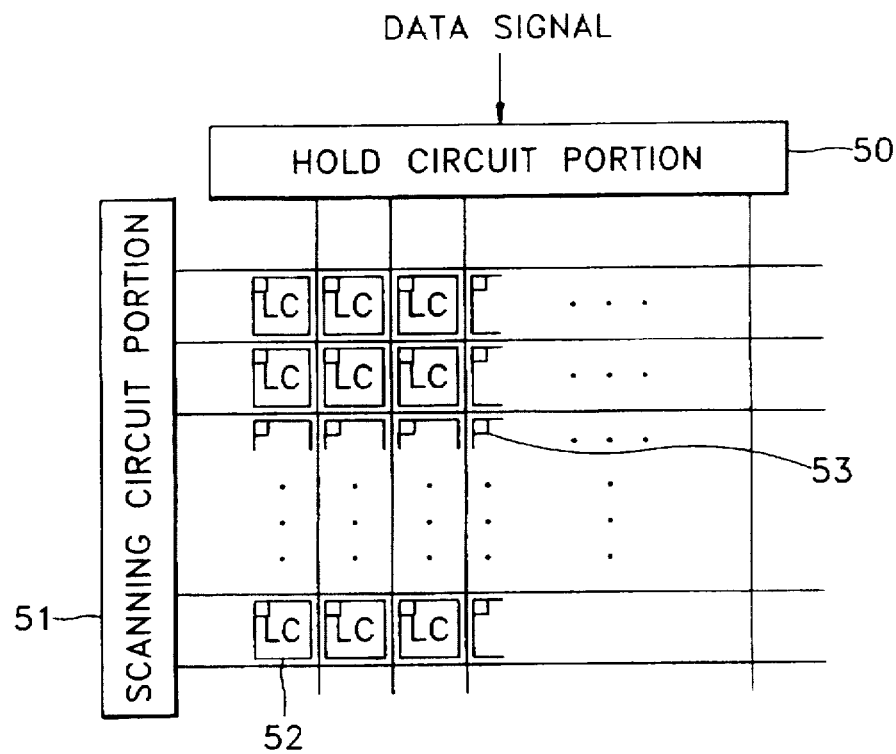
FIG. 24 is a schematic diagram for explaining the structure of the TFT LCD panel of FIG. 22.

FIG. 24 is a schematic diagram illustrating the structure of the TFT LCD panel of FIG. 22. As shown in FIG. 24, the TFT LCD panel 45 of the present embodiment includes a hold circuit portion 50 for outputting a predetermined mask image signal by processing the data signal input from the image display driver 27; a scanning circuit portion 51 for generating a predetermined scanning signal to select the corresponding cross row; and liquid crystal cells 52. Each liquid crystal cell 52 includes an additional cell driving transistor 53.

Figure 25:
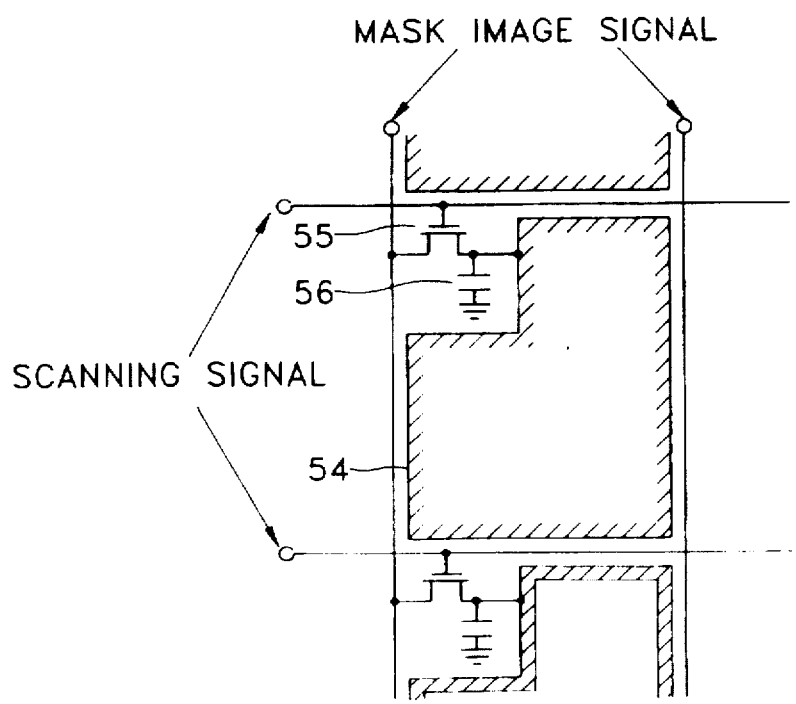
FIG. 25 is an enlarged view for explaining the structure of the liquid crystal portion of the TFT LCD panel of FIG. 24.

FIG. 25 is an enlarged view of FIG. 24 showing the structure of the liquid crystal cell 52 of FIG. 24. As shown in FIG. 25, the liquid crystal cell 52 applied to the present embodiment includes a pixel liquid crystal cell 54, a cell driving field effect transistor (FET) 55 and a signal storage capacitor 56. Since the pixel liquid crystal cell 54 has electrical capacity, signal maintenance is possible without the signal storage capacitor 56. However, the signal storage capacitor 56 may be necessary according to the cell gap and the dielectric constant of the liquid crystal itself. In FIG. 25, as the cell driving FET 55 selected by the mask image signal and the scanning signal turns on, a driving current by the mask image signal flows toward a ground via the pixel liquid crustal cell 54.

Figure 26:
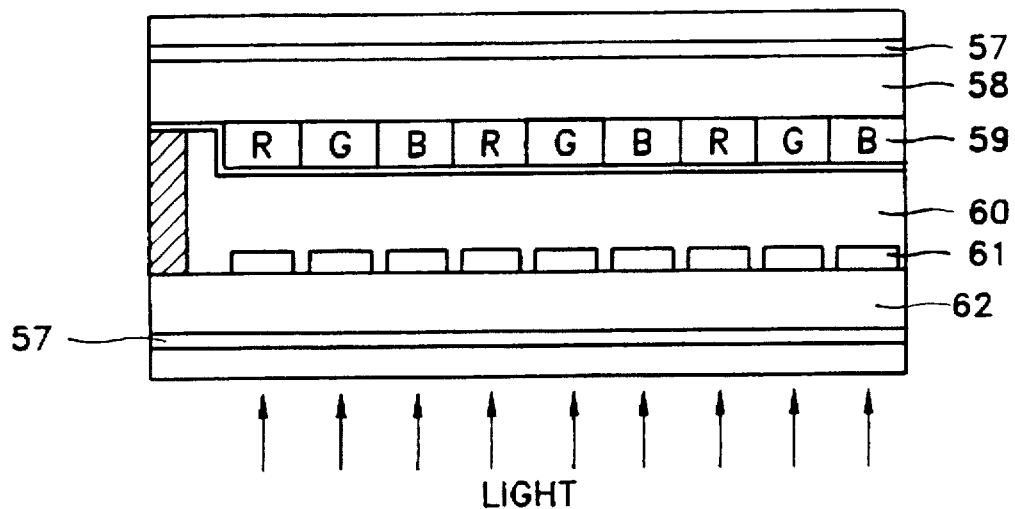
FIG. 26 schematically shows a vertical section of a color TFT LCD image display which can be applied to the present invention.

FIG. 26 schematically shows a vertical section of a color TFT LCD image display which can be applied to the present invention. In the color TFT LCD image display, it is preferable that the active matrix driving method is employed to the dot-matrix type TFT LCD as the black/white TFT LCD image display. In the vertical structure thereof, there is included a liquid crystal portion 60 at a central position, a color filter 59 of red, green and blue elements located on the liquid crystal portion, 60, a TFT portion 61 located at the lower portion of the liquid crystal portion 60, upper and lower glass substrates 58 and 62 located on the color filter 59 and below the TFT 61, respectively, and a polarizing film 57 located both on the upper glass substrate 58 and below the lower glass substrate 62, respectively. A color mixing method through addition by which red, green and blue are properly mixed is employed to convert the black/white TFT LCD to the color TFT LCD. As the array method of the color filter, a mosaic array, delta array and a square array can be applied instead of the strap array shown in FIG. 26.

Figure 27:
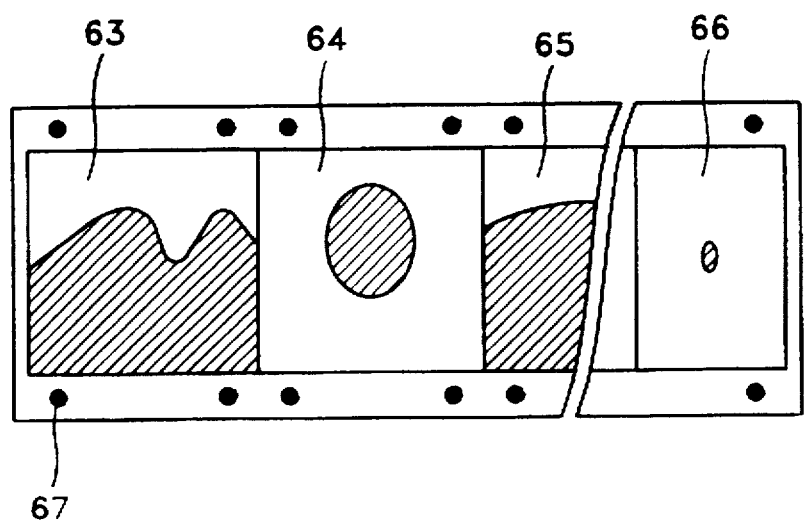
FIG. 27 shows an example of a cover film which can be applied according to another embodiment of the present invention.
Figure 28:
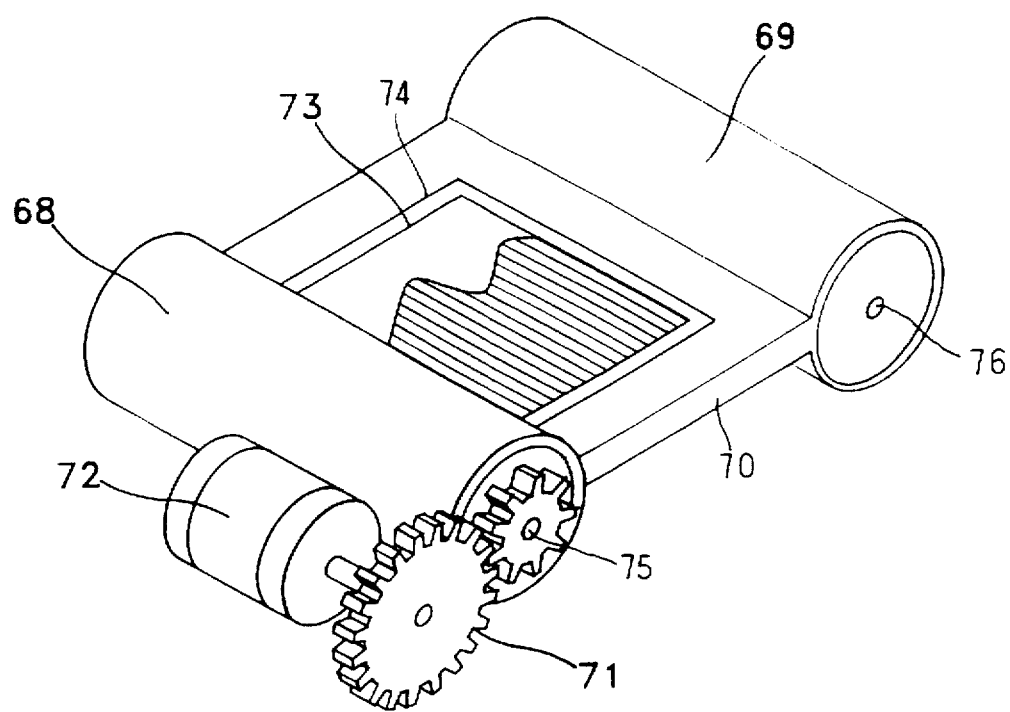
FIG. 28 is a schematic of a film type image display where the cover film of FIG. 27 can be provided.

The present invention is not limited to the above embodiment. For example, to automatically perform the partial exposure compensation, the image display 17 can be substituted by a film type image display. FIG. 27 shows an example of a cover film which can be applied according to another embodiment of the present invention. In FIG. 27, there is included a first cover film 63, a second cover film 64, a third cover film 65, an N-th cover film 66 and a feed hole 67. As shown in the drawing, each cover film has various shapes to be selected by a user. FIG. 28 shows a film type image display where the cover film of FIG. 27 can be loaded. As shown in FIG. 28, the film type image display according to the present invention comprises an opening portion 74 through which light can pass being positioned at the central portion thereof, a case 70 having film containers 68 and 69 at both side edges thereof, a pair of rollers 75 and 76 each being rotatably installed inside the film containers 68 and 69, a film feeding gear 71 associated with at least one of the rollers 75 and 76, and a motor 72 for rotating the film feeding gear 71 according to an applied driving signal. The cover film 73 is wound on the rollers 75 and 76. When the film type image display as shown in FIG. 28 is applied as the image display 17 instead of the TFT LCD image display, the circuit and algorithm of the image processor 15 is simplified. For instance, after the image of the cover film 73 over the image of the main film 5 is sequentially represented through the display 25, a user can select a desired cover film through the user input portion 24.

As described above, in the photographic printer according to the present invention, partial exposure compensation, double exposure printing and index photograph processing can be performed automatically to thereby save efforts and working time consumed in printing.

It is noted that the present invention is not limited to the preferred embodiment described above, and it is apparent that variations and modifications by those skilled in the art can be effected within the spirit and scope of the present invention defined in the appended claims.

What is claimed is:

1. A photographic printer comprising:
   a light source for radiating light rays for photographic printing to a film;
   means for fixing said film;
   means for providing a film information signal by detecting the light filtered through said film;
   image processing means for processing said film information signal and generating a corresponding control signal;
   image display means located between said light source and said film for displaying an image corresponding to said control signal;
   means for forming an image on a printing paper according to the light filtered through said image display means and said film; and
   printing control means that communicates with said image processing means via a control information signal for controlling said film fixing means, said light source, and/or said forming means.

2. A photographic printer as claimed in claim 1, wherein said image processing means comprises:
   means for storing film information data by processing a film information signal input;
   a microcomputer for performing control of the entire system according to a built-in program and commands from a user;
   user input means for inputting data to said microcomputer by the user;
   means for displaying the output data of the microcomputer;
   a user interface for interfacing data transmitted and received between said microcomputer, said user input means and said display means; and
   image display driving means for generating an image display driving signal according to the control of said microcomputer.

3. A photographic printer as claimed in claim 2, wherein said film information storing means comprises:
  means for separating and processing an image signal from the film information signal output from said film information providing means;
  analog-to-digital converting means for converting the separated and processed image signal into digital image data;
  a film image memory for storing said digital image data;
  means for controlling the input/output of said film image memory;
  means for controlling an address by which said digital image data is stored in said film image memory according to a synchronizing signal in said film information signal;
  means for separating the synchronizing signal from said film information signal; and
  means for processing the output signals of sensors which detect the loading of a film or a printing paper and converting the processed signals into predetermined digital signals.

4. A photographic printer as claimed in claim 3, wherein said image signal separating and processing means processes said separated image signal to output a red signal, a green signal and a blue signal.

5. A photographic printer as claimed in claim 3, wherein said image signal separating and processing means processes said separated image signal to output a red signal in which a brightness component is removed, a blue signal in which the brightness component is removed, and a brightness signal.

6. A photographic printer as claimed in claim 2, wherein said image display driving means comprises:
  driving means for generating an image display driving signal according to the control of said microcomputer;
  means for controlling the image data processed in said microcomputer and inputting said image data to said driving means; and
  digital-to-analog converting means for converting the digital signal output from said driving means into a predetermined analog signal.

7. A photographic printer as claimed in claim 6, wherein said driving means includes a liquid crystal display driving pulse generator and a liquid crystal display image signal generator.

8. A photographic printer as claimed in claim 2, wherein said user interface comprises: input driving means for converting a signal from said user input means to meet the specifications of said microcomputer; and
  display controlling means for converting the output signal of said microcomputer into a signal suitable for said display means.

9. A photographic printer as claimed in claim 2, wherein said photographic printer further comprises:
  means for fixing said printing paper; and
  exposure shutter means for controlling the exposure of said printing paper.

10. A photographic printer as claimed in claim 9, wherein said printing control means also controls said printing paper fixing means and said exposure shutter means.

11. A photographic printer as claimed in claim 10, wherein said microcomputer comprises:
  microprocessing means equipped with a microprocessor and a peripheral portion thereof;
  program memory where a program to be applied is stored;
  an interface for communication with said printing control means;
  an image processing memory for storing the output data processed in said microprocessing means; and
  means for controlling the address of said image processing memory.

12. A photographic printer as claimed in claim 1, wherein said image display means has a flat type display device.

13. A photographic printer as claimed in claim 12, wherein said flat type display device is a liquid crystal display device.

14. A photographic printer as claimed in claim 1, wherein said image display means comprises:
  a case having an opening portion through which light passes at the central portion thereof and having containers for a cover film each located at either side of the case;
  a pair of rollers each being rotatably installed inside said containers;
  a film feeding gear associated with at least one of said rollers; and
  a motor for rotating said film feeding gear according to an applied driving signal.

15. A photographic printer as claimed in claim 14, wherein said cover film is wound on said rollers.

16. A photographic printer as claimed in claim 1, wherein said film information providing means is a video camera or a scanner.

17. A method for processing images in a photographic printer having a light source for radiating light rays for photographic printing to a film, means for fixing said film, means for providing a film information signal by detecting the light filtered through said film, image processing means for processing said film information signal and generating a corresponding control signal, image display means located between said light source and said film for displaying an image corresponding to said control signal, means for forming an image on a printing paper according to the light filtered through said image display means and said film, means for fixing said printing paper, exposure shutter means for controlling the exposure of said printing paper, and printing control means for controlling said film fixing means, said printing paper fixing means, said exposure shutter means, said forming means and said light source; wherein said image processing means has means for storing film information data by processing a film information signal input, a microcomputer for performing control of the entire system according to a built-in program and commands from a user, user input means for inputting data to said microcomputer by the user, means for displaying the output data of the microcomputer, a user interface for interfacing data transmitted and received between said microcomputer, said user input means and said display means, and image display driving means for generating an image display driving signal according to the control of said microcomputer; the method comprising the steps of:
  selecting a photographic printing mode by a user;
  loading a film cassette and a printing paper roll;
  determining the printing mode based on the input data and performing printing in accordance with the printing mode;
  confirming whether the printing operation will be continued after transferring the printing paper by one cut when the printing is completed according to the printing mode; and repeating the above steps or stopping the program according to a command input.

18. The method of claim 17 wherein the step of selecting comprises the step of selecting a partial exposure compensation, an index photograph processing, and a double exposure printing.

19. The method of claim 18, wherein said partial exposure compensation comprises the steps of:
   (a1) controlling the average brightness of said film with the transmissivity of said image display means;
   (a2) setting image data for the partial exposure compensation based on a predetermined reference value;
   (a3) driving said image display means according to said image data and storing the result thereof;
   (a4) checking the stored result and compensating the transmissivity of said image display means with respect to a relatively dark portion;
   (a5) checking the stored result and compensating the transmissivity of said image display means with respect to a relatively bright portion;
   (a6) compensating the transmissivity to the overall area of said image display means; and
   (a7) performing printing in a state where said image display means is driven.

20. The method of claim 19, wherein said step a1 comprises the steps of:
   (a11) setting data of the initial transmissivity on the entire area after one cut of a film is transferred;
   (a12) driving said image display means based on the image processing data of said image processing means;
   (a13) inputting the film image signal at the time of transmission corresponding to the initial transmissivity through said film information input means;
   (a14) calculating the average brightness of the corresponding film by obtaining the data average of said film image signal; and
   (a15) controlling said average brightness to be within a predetermined range.

21. The method of claim 20, wherein said step a15 comprises the steps of:
   lowering the transmissivity of said image display means by a set decrement when the calculated average brightness is higher than the predetermined average brightness;
   repeating the steps from the step a12 when the lowered transmissivity is lower than a predetermined lower limit transmissivity;
   raising the transmissivity of said image display means by a set increment when the calculated average brightness is lower than the predetermined average brightness; and
   repeating the steps from the step a12 when the raised transmissivity is higher than a predetermined upper limit transmissivity.

22. The method of claim 19, wherein said step a2 comprises the steps of:
   (a21) recognizing relatively bright, dark and midway portions by comparing said image data with a predetermined reference value;
   (a22) applying the data of the bright portion as it is when the bright portion is within a predetermined range;
   (a23) applying the data of the dark portion as it is when the dark portion is within a predetermined range; and
   (a24) setting the minimum transmissivity data to the entire area.

23. The method of claim 19, wherein said step a3 comprises the steps of:
   (a31) driving said image display means based on the image data set in said step a2;
   (a32) inputting the film image signal through said film information providing means;
   (a33) obtaining a difference value between adjacent data in the relatively dark portion and an average difference value to the absolute value of each difference value;
   (a34) obtaining a difference value between adjacent data in the relatively bright portion and an average difference value to the absolute value of each difference value; and
   (a35) controlling image processing data to be applied to be higher than a predetermined minimum transmissivity data.

24. The method of claim 23, wherein said step a35 comprises the step of repeating the steps from the step a31 after the image processing data is increased by a predetermined increment when said image processing data is not higher than said minimum transmissivity data.

25. The method of claim 23, wherein said step a4 comprises the steps of:
   (a41) obtaining a first transmissivity if when average difference value becomes maximum if it is determined that the darker portion has been corrected and then compensation of relatively dark portion is required;
   (a42) obtaining a second transmissivity when said average difference value changes at its maximum with respect to the change of the transmissivity; and
   (a43) obtaining an intermediate value between said first and second transmissivities and setting the obtained value as a compensation transmissivity.

26. The method of claim 25 wherein said step a43 comprises the steps of:
   performing the compensation to the relatively dark portion when said average difference value is higher than the difference value set according to the corresponding transmissivity, and
   not performing the compensation when said average difference value is not higher than the difference value.

27. The method of claim 23, wherein said step as comprises the steps of:
   (a51) obtaining a first transmissivity when said average difference value becomes maximum when it is determined that the brighter portion has been corrected and then compensation of the relatively bright portion is required;
   (a52) obtaining a second transmissivity when said average difference value changes at its maximum with respect to the change of the transmissivity; and
   (a53) obtaining an intermediate value between said first and second transmissivities and setting the obtained value as a compensation transmissivity.

28. The method of claim 27, wherein said step a51 comprises:
   performing the compensation to the relatively bright portion when said average difference value is higher than the difference value set according to the corresponding transmissivity, and
   not performing the compensation when said average difference value is not higher than the difference value.

29. The method of claim 19, wherein said step a6 comprises the steps of:

(a61) setting the optimal transmissivity with respect to the average brightness on the entire area;

(a62) checking whether compensation to the brighter portion and the darker portion are concurrently required;

(a63) performing the compensation when the concurrent compensations are required, and when it is determined that the compensation transmissivity of the darker portion and that of the brighter portion are larger than the set value;

(a64) applying the data compensated in said steps a4 and a5 when it is determined that the compensation is needed in said step a63 and when it is determined that the compensation transmissivity of the darker portion is larger than that of the brighter portion; and (a65) applying the data compensated in said steps a4 or a5 when concurrent compensation is not required and when it is determined that compensation of the darker or brighter portion is required.

30. The method of claim 19, wherein said step a7 comprises the steps of:

driving said image display means based on the image data set in said step a6; and performing exposure and printing by controlling said printing control means.

31. The method of claim 18 wherein said index photograph processing comprises the steps of:

inputting the film image signal output from said film information providing means after one cut of film is transferred;

processing said film image signal and storing the result;

processing said stored data by a predetermined image data compression method and storing the result;

determining whether the applied film is the last cut of the film, and if the applied film is not the last cut of the film, repeating said steps while controlling said printing control means, and if the applied film is the last cut of the film, performing the following steps;

displaying the image-processed result for a user;

transferring the focus of said image forming lens portion from the film to said image display means after transferring and removing the used film by one cut by controlling said printing control means; and exposing the image of said image display means onto the printing paper.

32. The method of claim 18, wherein said double exposure printing comprises the steps of:

(b1) processing and storing the image data of first and second films, respectively;

(b2) displaying the images of said first and second films for a user and displaying a message of inputting an area to be superimposed;

(b3) displaying a superimposed double screen when the area to be superimposed is input by the user;

(b4) displaying a message of loading said first film to load said first film;

(b5) setting the maximum transmissivity of said image display means to the entire area of the image;

(b6) setting the minimum transmissivity of said image display means on the area of the image to be superimposed;

(b7) driving said image display means and performing exposure and printing by controlling said printing control means;

(b8) displaying a message of loading said second film to load the same;

(b9) inverting the entire stored data; and (b10) driving said image display means and performing exposure and superimposing printing by controlling said printing control means.

33. The method of claim 32, wherein in said step b1 said first film is a film for a background.

34. The method of claim 32, wherein said step b1 comprises the steps of:

displaying a message of loading said first film for a user and loading said first film;

processing and storing a first film image signal output from said film information providing means;

displaying a message of loading said second film for a user and loading said second film; and processing and storing a second film image signal output from said film information providing means.

* * * * *

UNITED STATES PATENT AND TRADEMARK OFFICE
CERTIFICATE OF CORRECTION

PATENT NO. : 5,796,466
DATED : August 18, 1998
INVENTOR(S) : Yong-hag CHOI

It is certified that error appears in the above-indentified patent and that said Letters Patent is hereby corrected as shown below:

Title Page, Item [73], in the Assignee, line 1, "LTD." should read --Ltd.--.

Claim 8, Col. 13, line 48, after "comprises:", insert a line break.

Claim 18, Col. 15, line 3, after "claim 17", insert --,--.

Claim 26, Col. 16, line 36, after "claim 25", insert --,--.

* Claim 27, Col. 16, line 44, "as" should read --a5--.

Claim 31, Col. 17, line 27, after "claim 18", insert --,--.

Signed and Sealed this

Second Day of November, 1999

Attest:

Attesting Officer

Q. TODD DICKINSON

Acting Commissioner of Patents and Trademarks